US011083994B2

(12) United States Patent
Northrop et al.

(10) Patent No.: US 11,083,994 B2
(45) Date of Patent: Aug. 10, 2021

(54) REMOVAL OF ACID GASES FROM A GAS STREAM, WITH O2 ENRICHMENT FOR ACID GAS CAPTURE AND SEQUESTRATION

(71) Applicant: ExxonMobil Upstream Research Company, Spring, TX (US)

(72) Inventors: P. Scott Northrop, Spring, TX (US); Tye R. Aikins, Spring, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 0 days.

(21) Appl. No.: 16/916,983

(22) Filed: Jun. 30, 2020

(65) Prior Publication Data

US 2021/0086131 A1  Mar. 25, 2021

Related U.S. Application Data

(60) Provisional application No. 62/903,168, filed on Sep. 20, 2019.

(51) Int. Cl.
*B01D 53/00* (2006.01)
*B01D 53/14* (2006.01)
(Continued)

(52) U.S. Cl.
CPC ......... *B01D 53/526* (2013.01); *B01D 53/002* (2013.01); *B01D 53/1425* (2013.01);
(Continued)

(58) Field of Classification Search
CPC .............. B01D 53/526; B01D 53/1462; B01D 53/1425; B01D 53/1431; C01B 17/0404;
(Continued)

(56) References Cited

U.S. PATENT DOCUMENTS

| 1,914,337 A | 6/1933 | Belt |
| 1,974,145 A | 9/1934 | Atwell |

(Continued)

FOREIGN PATENT DOCUMENTS

| CN | 102620523 | 10/2014 |
| CN | 102628635 | 10/2014 |

(Continued)

OTHER PUBLICATIONS

Bach, Wilfried (1990) "Offshore Natural Gas Liquefaction with Nitrogen Cooling—Process Design and Comparison of Coil-Wound and Plate-Fin Heat Exchangers," *Science and Technology Reports*, No. 64, Jan. 1, 1990, pp. 31-37.

(Continued)

*Primary Examiner* — Timothy C Vanoy
(74) *Attorney, Agent, or Firm* — ExxonMobil Upstream Research Company-Law Department

(57) ABSTRACT

A method and apparatus for processing a hydrocarbon gas stream including sulfurous components and carbon dioxide. The hydrocarbon gas stream is separated into a sweetened gas stream and an acid gas stream. The acid gas stream and an air stream, enriched with oxygen such that the air stream comprises between 22% and 100% oxygen, are combusted in a sulfur recovery unit to separate the acid gas stream into a liquid stream of elemental sulfur and a tail gas stream comprising acid gas impurities. The tail gas stream and an air flow are sub-stoichiometrically combusted to produce an outlet stream comprising hydrogen sulfide and carbon monoxide. The outlet stream is hydrogenated to convert sulfur species to a gaseous catalytic output stream comprising hydrogen sulfide. Water is removed from the gaseous catalytic output stream to produce a partially-dehydrated acid gas stream, which is pressurized and injected into a subsurface reservoir.

19 Claims, 8 Drawing Sheets

(51) Int. Cl.
*B01D 53/26* (2006.01)
*B01D 53/52* (2006.01)
*C01B 17/04* (2006.01)
*E21B 41/00* (2006.01)
*E21B 43/16* (2006.01)

(52) U.S. Cl.
CPC ..... *B01D 53/1431* (2013.01); *B01D 53/1462* (2013.01); *B01D 53/1493* (2013.01); *B01D 53/26* (2013.01); *C01B 17/0447* (2013.01); *E21B 41/0064* (2013.01); *E21B 43/168* (2013.01); *B01D 2252/20489* (2013.01)

(58) Field of Classification Search
CPC . C01B 17/0413; C01B 17/0456; C10L 3/102; C10L 3/103; C10L 2290/541; E21B 41/0064; E21B 43/168
See application file for complete search history.

(56) References Cited

U.S. PATENT DOCUMENTS

| | | |
|---|---|---|
| 2,007,271 A | 7/1935 | Frankl |
| 2,011,550 A | 8/1935 | Hasche |
| 2,321,262 A | 6/1943 | Taylor |
| 2,475,255 A | 7/1949 | Rollman |
| 2,537,045 A | 1/1951 | Garbo |
| 2,900,797 A | 8/1959 | Kurata et al. |
| 2,975,604 A | 3/1961 | McMahon |
| 2,986,010 A | 5/1961 | Beckwith |
| 3,014,082 A | 12/1961 | Woertz, III |
| 3,018,632 A | 1/1962 | Keith |
| 3,103,427 A | 9/1963 | Jennings |
| 3,180,709 A | 4/1965 | Yendall et al. |
| 3,347,055 A | 10/1967 | Blanchard et al. |
| 3,370,435 A | 2/1968 | Arregger |
| 3,376,709 A | 4/1968 | Dickey et al. |
| 3,398,544 A | 8/1968 | Crownover |
| 3,400,512 A | 9/1968 | McKay |
| 3,400,547 A | 9/1968 | Williams et al. |
| 3,511,058 A | 5/1970 | Becker |
| 3,724,225 A | 4/1973 | Mancini et al. |
| 3,724,226 A | 4/1973 | Pachaly |
| 3,850,001 A | 11/1974 | Locke |
| 3,878,689 A | 4/1975 | Grenci |
| 4,281,518 A | 8/1981 | Muller et al. |
| 4,415,345 A | 11/1983 | Swallow |
| 4,533,372 A | 8/1985 | Valencia et al. |
| 4,552,747 A * | 11/1985 | Goar ................. C01B 17/0413 423/574.1 |
| 4,604,115 A | 8/1986 | Bonneton et al. |
| 4,609,388 A | 9/1986 | Adler et al. |
| 4,669,277 A | 6/1987 | Goldstein |
| 4,765,407 A | 8/1988 | Yuvancic |
| 4,769,054 A | 9/1988 | Steigman |
| 4,923,493 A | 5/1990 | Valencia et al. |
| 5,025,860 A | 6/1991 | Mandrin |
| 5,062,270 A | 11/1991 | Haut et al. |
| 5,120,338 A | 6/1992 | Potts, Jr. et al. |
| 5,137,558 A | 8/1992 | Agrawal |
| 5,139,547 A | 8/1992 | Agrawal et al. |
| 5,141,543 A | 8/1992 | Agrawal et al. |
| 5,638,698 A | 6/1997 | Knight et al. |
| 5,950,453 A | 9/1999 | Bowen et al. |
| 6,003,603 A | 12/1999 | Breivik et al. |
| 6,053,007 A | 4/2000 | Victory et al. |
| 6,082,133 A | 7/2000 | Barclay et al. |
| 6,158,242 A | 12/2000 | Lu |
| 6,237,347 B1 | 5/2001 | Rigby et al. |
| 6,295,838 B1 | 10/2001 | Shah et al. |
| 6,298,688 B1 | 10/2001 | Brostow et al. |
| 6,308,531 B1 | 10/2001 | Roberts et al. |
| 6,412,302 B1 | 7/2002 | Foglietta |
| 6,662,589 B1 | 12/2003 | Roberts et al. |
| 6,889,522 B2 | 5/2005 | Prible et al. |
| 7,143,606 B2 | 12/2006 | Trainer |
| 7,219,512 B1 | 5/2007 | Wilding et al. |
| 7,278,281 B2 | 10/2007 | Yang et al. |
| 7,325,415 B2 | 2/2008 | Amin et al. |
| 7,386,996 B2 | 6/2008 | Fredheim et al. |
| 7,520,143 B2 | 4/2009 | Spilsbury |
| 7,712,331 B2 | 5/2010 | Dee et al. |
| 8,079,321 B2 | 12/2011 | Balasubramanian |
| 8,435,403 B2 | 5/2013 | Sapper et al. |
| 8,464,289 B2 | 6/2013 | Pan |
| 8,601,833 B2 | 12/2013 | Dee et al. |
| 8,616,012 B2 | 12/2013 | Duerr et al. |
| 8,616,021 B2 | 12/2013 | Minta |
| 8,658,116 B2 * | 2/2014 | Milam ................. C01B 17/74 423/224 |
| 8,747,520 B2 | 6/2014 | Bearden et al. |
| 9,016,088 B2 | 4/2015 | Butts |
| 9,149,761 B2 | 10/2015 | Northrop et al. |
| 9,339,752 B2 | 5/2016 | Reddy et al. |
| 9,435,229 B2 | 9/2016 | Alekseev et al. |
| 9,439,077 B2 | 9/2016 | Gupta et al. |
| 9,459,042 B2 | 10/2016 | Chantant et al. |
| 9,995,521 B2 | 6/2018 | Mogilevsky |
| 10,294,433 B2 | 5/2019 | Grainger et al. |
| 10,696,360 B2 | 6/2020 | Balasubramanian |
| 2006/0000615 A1 | 1/2006 | Choi |
| 2007/0277674 A1 | 12/2007 | Hirano et al. |
| 2008/0087421 A1 | 4/2008 | Kaminsky |
| 2008/0302133 A1 | 12/2008 | Saysset et al. |
| 2009/0217701 A1 | 9/2009 | Minta et al. |
| 2010/0192626 A1 | 8/2010 | Chantant |
| 2010/0251763 A1 | 10/2010 | Audun |
| 2011/0036121 A1 | 2/2011 | Roberts et al. |
| 2011/0126451 A1 | 6/2011 | Pan et al. |
| 2011/0259044 A1 | 10/2011 | Baudat et al. |
| 2012/0060553 A1 | 3/2012 | Bauer |
| 2012/0180657 A1 | 7/2012 | Monereau et al. |
| 2012/0279728 A1 | 11/2012 | Northrop et al. |
| 2012/0285196 A1 | 11/2012 | Flinn et al. |
| 2013/0071308 A1 | 3/2013 | Graville |
| 2013/0074541 A1 | 3/2013 | Kaminsky et al. |
| 2013/0199238 A1 | 8/2013 | Mock et al. |
| 2014/0130542 A1 | 5/2014 | Brown et al. |
| 2015/0191360 A1 | 7/2015 | Weiss et al. |
| 2015/0285553 A1 | 10/2015 | Oelfke et al. |
| 2016/0108333 A1 | 4/2016 | Weiss et al. |
| 2017/0010041 A1 | 1/2017 | Pierre, Jr. et al. |
| 2017/0016667 A1 | 1/2017 | Huntington et al. |
| 2017/0016668 A1 | 1/2017 | Pierre, Jr. et al. |
| 2017/0167785 A1 | 6/2017 | Pierre, Jr. et al. |
| 2017/0167786 A1 | 6/2017 | Pierre, Jr. |
| 2017/0167787 A1 | 6/2017 | Pierre, Jr. et al. |
| 2017/0167788 A1 | 6/2017 | Pierre, Jr. et al. |
| 2018/0231303 A1 | 8/2018 | Pierre, Jr. |
| 2018/0231305 A1 | 8/2018 | Pierre, Jr. |
| 2018/0292128 A1 | 10/2018 | Degenstein et al. |
| 2020/0248871 A1 | 8/2020 | Kaminsky et al. |
| 2020/0277186 A1* | 9/2020 | O'Connell ............ C01B 17/162 |

FOREIGN PATENT DOCUMENTS

| | | |
|---|---|---|
| DE | 1960515 | 5/1971 |
| DE | 2354726 | 5/1975 |
| DE | 3149847 | 7/1983 |
| DE | 3622145 | 1/1988 |
| DE | 19906602 | 8/2000 |
| DE | 102013007208 | 10/2014 |
| EP | 1715267 | 10/2006 |
| EP | 1972875 | 9/2008 |
| EP | 2157013 | 8/2009 |
| EP | 2629035 | 8/2013 |
| FR | 2756368 | 5/1998 |
| GB | 1376678 | 12/1974 |
| GB | 1596330 | 8/1981 |
| GB | 2172388 | 9/1986 |
| GB | 2333148 | 7/1999 |
| GB | 2470062 | 11/2010 |
| GB | 2486036 | 11/2012 |
| JP | 59216785 | 12/1984 |

(56) References Cited

FOREIGN PATENT DOCUMENTS

| | | |
|---|---|---|
| JP | 2530859 | 4/1997 |
| JP | 5705271 | 11/2013 |
| JP | 5518531 | 6/2014 |
| KR | 2010/0112708 | 10/2010 |
| KR | 2011/0079949 | 7/2011 |
| WO | WO2006/120127 | 11/2006 |
| WO | WO2008/133785 | 11/2008 |
| WO | WO2011/101461 | 8/2011 |
| WO | WO2012/031782 | 3/2012 |
| WO | WO2012/162690 | 11/2012 |
| WO | WO2014/048845 | 4/2014 |
| WO | WO2015/110443 | 7/2015 |
| WO | WO2016/060777 | 4/2016 |
| WO | WO2017/011123 | 1/2017 |
| WO | WO2017/067871 | 4/2017 |

OTHER PUBLICATIONS

Chang, Ho-Myung et al, (2019) "Thermodynamic Design of Methane Liquefaction System Based on Reversed-Brayton Cycle" Cryogenics, pp. 226-234.

ConocoPhillips Liquefied Natural Gas Licensing (2017) "Our Technology and Expertise Are Ready to Work Toward Your LNG Future Today," http://lnglicensing.conocophillips.com/Documents/15-1106%20LNG%20Brochure_March2016.pdf, Apr. 25, 2017, 5 pgs.

Danish Technologies Institute (2017) "Project—Ice Bank System with Pulsating and Flexible Heat Exchanger (IPFLEX)," https://www.dti.dk/projects/project-ice-bank-system-with-pulsating-andflexible-heat-exchanger-ipflex/37176.

Diocee, T. S. et al. (2004) "Atlantic LNG Train 4-The Worlds Largest LNG Train", *The 14th International Conference and Exhibition on Liquefied Natural Gas (LNG 14)*, Doha, Qatar, Mar. 21-24, 2004, 15 pgs.

Khoo, C. T. et al. (2009) "Execution of LNG Mega Trains—The Qatargas 2 Experience," *WCG*, 2009, 8 pages.

Laforte, C. et al. (2009) "Tensile, Torsional and Bending Strain at the Adhesive Rupture of an Iced Substrate," *ASME 28th Int'l Conf. on Ocean, Offshore and Arctic Eng.*, OMAE2009-79458, 8 pgs.

McLachlan, Greg (2002) "Efficient Operation of LNG From the Oman LNG Project," *Shell Global Solutions International B. V.*, Jan. 1, 2002, pp. 1-8.

Olsen, Lars et al. (2017).

Ott, C. M. et al. (2015) "Large LNG Trains: Technology Advances to Address Market Challenges", *Gastech*, Singapore, Oct. 27-30, 2015, 10 pgs.

Publication No. 43031 (2000) Research Disclosure, Mason Publications, Hampshire, GB, Feb. 1, 2000, p. 239, XP000969014, ISSN: 0374-4353, paragraphs [0004], [0005] & [0006].

Publication No. 37752 (1995) Research Disclosure, Mason Publications, Hampshire, GB, Sep. 1, 1995, p. 632, XP000536225, ISSN: 0374-4353, 1 page.

Ramshaw, Ian et al. (2009) "The Layout Challenges of Large Scale Floating LNG," *ConocoPhillips Global LNG Collaboration*, 2009, 24 pgs, XP009144486.

Riordan, Frank (1986) "A Deformable Heat Exchanger Separated by a Helicoid," *Journal of Physics A: Mathematical and General*, v. 19.9, pp. 1505-1515.

Roberts, M. J. et al. (2004) "Reducing LNG Capital Cost in Today's Competitive Environment", PS2-6, *The 14th International Conference and Exhibition on Liquefied Natural Gas (LNG 14)*, Doha, Qatar, Mar. 21-24, 2004, 12 pgs.

Shah, Pankaj et al. (2013) "Refrigeration Compressor Driver Selection and Technology Qualification Enhances Value for the Wheatstone Project," *17th Int'l Conf. & Exh. on LNG*, 27 pgs.

Tan, Hongbo et al. (2016) "Proposal and Design of a Natural Gas Liquefaction Process Recovering the Energy Obtained from the Pressure Reducing Stations of High-Pressure Pipelines," *Cryogenics*, Elsevier, Kidlington, GB, v.80, Sep. 22, 2016, pp. 82-90.

Tianbiao, He et al. (2015), Optimal Synthesis of Expansion Liquefaction Cycle for Distributed-Scale LNG, *Institute of Refrigeration and Cryogenics, Shanghai Jiao Tong University*, pp. 268-280.

Tsang, T. P. et al. (2009) "Application of Novel Compressor/Driver Configuration in the Optimized Cascade Process," *2009 Spring Mtg. and Global Conf. on Process Safety—9th Topical Conf. on Gas Utilization*, 2009, Abstract, 1 pg. https://www.aiche.org/conferences/aiche-spring-meeting-and-globalcongress- on-process-safety/2009/proceeding/paper/7a-application-novel-compressordriver-configurationoptimized-cascader-process.

* cited by examiner

REMOVAL OF ACID GASES FROM A GAS STREAM, WITH O2 ENRICHMENT FOR ACID GAS CAPTURE AND SEQUESTRATION

CROSS-REFERENCE TO RELATED APPLICATION

This application claims the benefit of U.S. Provisional Patent Application 62/903,168, filed Sep. 20, 2019, and titled REMOVAL OF ACID GASES FROM A GAS STREAM, WITH $O_2$ ENRICHMENT FOR ACID GAS CAPTURE AND SEQUESTRATION, the entirety of which is incorporated by reference herein.

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

FIELD OF THE INVENTION

The present invention relates to the field of fluid separation. More specifically, the present invention relates to the removal of acid gas, such as carbon dioxide and/or sulfurous components, from a hydrocarbon fluid stream, and to the recovery of the acid gas associated with the hydrocarbon fluid stream.

Discussion of Technology

The production of raw natural gas from a reservoir oftentimes carries with it the incidental production of non-hydrocarbon gases. Such gases may include trace amounts of helium or nitrogen. Such gases may also include contaminants such as carbon dioxide ($CO_2$), or various sulfur-containing compounds. Sulfur-containing compounds may include hydrogen sulfide ($H_2S$), carbonyl sulfide (COS), carbon disulfide ($CS_2$), mercaptans, organic sulfides, and thiophenes.

When $H_2S$ and $CO_2$ are produced as part of a hydrocarbon gas stream (such as methane or ethane), the gas stream is sometimes referred to as "sour gas." Sour gas is usually treated to remove $CO_2$, $H_2S$, and other contaminants before it is sent downstream for further processing or sale. Removal of acid gases creates a "sweetened" hydrocarbon gas stream. The sweetened gas stream may then be used as an environmentally-acceptable fuel, or it may be chilled into liquefied natural gas, or LNG, for transportation and later industrial or residential use.

Several processes have been devised to remove contaminants from a hydrocarbon gas stream. One commonly-used approach for treating raw natural gas involves the use of physical solvents. An example of a physical solvent is Selexol®. Selexol® is a trade name for a gas treating product of Union Carbide, which is a subsidiary of Dow Chemical Company. Selexol™ solvent is a mixture of dimethyl ethers of polyethylene glycols. An example of one such component is dimethoxy tetraethylene glycol. If Selexol™ solvent is chilled and then pre-saturated with $CO_2$, the Selexol™ solvent will be selective towards $H_2S$.

Another approach for treating raw natural gas involves the use of chemical solvents. An example of a chemical solvent is an $H_2S$-selective amine $H_2S$-selective amines include methyl diethanol amine (MDEA), and the Flexsorb® family of amines Flexsorb® amines are preferred chemical solvents for selectively removing $H_2S$ from $CO_2$-containing gas streams. Flexsorb® amines take advantage of the relatively fast rate of $H_2S$ absorption compared to $CO_2$ absorption. The sterically-hindered amine molecule helps to prevent the formation of carbamates, which are the "fast" reaction products between amine and $CO_2$.

Amine-based solvents rely on a chemical reaction with acid gas components in the hydrocarbon gas stream. The reaction process is sometimes referred to as "gas sweetening." Such chemical reactions are generally more effective than physical-based solvents, particularly at feed gas pressures below about 300 psia (2.07 MPa). In this respect, amine-based $H_2S$ removal may be done at low pressure.

Hybrid solvents have also been used for the removal of acidic components. Hybrid solvents employ a mixture of physical and chemical solvents. An example of a hybrid solvent is Sulfinol®.

The use of the above solvents involves optionally chilling the raw natural gas, and then mixing it with a "lean" solvent in a contactor vessel. When the solvent includes a chemical solvent, the contactor vessel may be referred to as an absorber vessel or a contacting tower. In this instance, the chemical solvent absorbs the acidic components. For example, the removal of hydrogen sulfide using a selective amine may be accomplished by contacting the optionally dehydrated and optionally chilled raw natural gas stream with the chemical solvent in an absorber vessel.

Traditionally, the removal of acid gases using chemical solvents involves counter-currently contacting the raw natural gas stream with the solvent. The raw gas stream is introduced into the bottom section of a contacting tower. At the same time, the solvent solution is directed into a top section of the tower. The tower has trays, packings or other "internals." As the liquid solvent cascades downwardly through the internals, it contacts the upwardly flowing raw gas stream, absorbs the undesirable acid gas components therein, and carries them away through the bottom of the contacting tower as part of a "rich" solvent solution. At the same time, gaseous fluid that is largely depleted of $H_2S$ and/or $CO_2$ exits at the top of the tower.

In the above process, the sweetened gas stream contains primarily methane with a smaller amount of carbon dioxide. This "sweet" gas flows out of the top of the contactor or absorber. The treated "sweet" gas can be further processed, such as for liquids recovery, or sold into a pipeline if the $CO_2$ concentration is less than, for example, about 2% by volume. In addition, the sweetened gas stream may be used as feedstock for a gas-to-liquids process, and then ultimately used to make waxes, butanes, lubricants, glycols and other petroleum-based products.

As noted, the solvent process also produces a "rich" solvent stream, containing the solvent and acidic components. The rich solvent can be regenerated by stripping the acidic components to make it lean again, so that the solvent may be recycled. The process of regeneration is also sometimes called "desorption" or "stripping," and is employed to separate acid gases from the active solvent of the absorbent liquid. What is left is a concentrated, acidic impurities stream comprising sulfur-containing compounds and some carbon dioxide.

The use of solvents for a gas separation processes may create an issue because the separated sulfurous contaminants must be disposed of. If appreciable levels of sulfur compounds are present in the acid gas, it must be reacted in some way to make a non-hazardous by-product such as elemental sulfur, or sequestered in some manner. In some cases, the concentrated acid gas (consisting primarily of $H_2S$ with some $CO_2$) is sent to a sulfur recovery unit ("SRU"). The SRU converts the $H_2S$ into benign elemental sulfur. There are many existing plants where the $H_2S$ is converted to sulfur and stored.

While the sulfur is stored on land, the carbon dioxide gas is oftentimes vented from the absorber vessel to the atmosphere. However, the practice of venting $CO_2$ may be undesirable. One proposal to minimize $CO_2$ emissions is a process called acid gas injection ("AGI"), in which unwanted sour gases are re-injected into a subterranean formation under pressure immediately following acid gas removal. AGI requires the availability of a suitable underground reservoir coupled with significant compression. $CO_2$ and $H_2S$ may optionally be injected and sequestered together.

In some instances, injected acid gas is used to create artificial reservoir pressure for enhanced oil recovery operations. This means that the acidic components are used as a miscible enhanced oil recovery (EOR) agent to recover additional oil. This is particularly attractive when the acid gas is primarily made up of carbon dioxide. If the volume and/or concentration of $H_2S$ is too high for a candidate injection reservoir, then the bulk of the $H_2S$ will again need to be converted into elemental sulfur before using the acid gas in an AGI process.

A known sulfur recovery process that converts $H_2S$ to elemental sulfur is the Claus process. In a Claus process, one-third of the hydrogen sulfide (and other sulfurous components) is burned with air in a reactor furnace to form $SO_2$ (and some elemental sulfur). This is an oxidation process performed according to the following reaction:

$$2H_2S+3O_2 \rightarrow 2SO_2+2H_2O$$

This is a strongly exothermic reaction that generates sulfur dioxide. If atmospheric air is used to supply the oxygen to this reaction, a substantial amount of nitrogen may enter the process at this point, but does not participate in the chemical reaction. A subsequent reaction takes place from the heating and oxidation, known as a Claus reaction, which forms the basis of the modified Claus process (MCP):

$$2H_2S+SO_2 \leftrightarrow 3S+2H_2O$$

As can be seen, sulfur and water are formed in this reaction. The sulfur and water are delivered to a condenser. Elemental sulfur is released from the condenser as a molten liquid. The molten sulfurous liquid may then be frozen into any number of forms.

The MCP is equilibrium-limited, which is to say that the reaction does not generally go to completion, though high conversions, i.e., greater than 95%, are possible. The higher the initial $H_2S$ concentration in the acid gas stream, the more efficient the Claus sulfur removal process is; but in practice, some amount of unreacted $H_2S$ and $SO_2$ remain. These gases are reheated and passed into a catalytic reactor containing alumina or titania catalyst. The catalyst facilitates further reaction between the $H_2S$ and $SO_2$ to form more elemental sulfur. This sequence of condensing sulfur, reheating gas, and passing it to a catalytic reactor may be repeated one or two more times to reach a desired level of sulfur recovery.

The MCP has been used successfully in numerous applications. The MCP works well for high concentrations (>50%) of $H_2S$, and low concentrations of heavy hydrocarbons (HHCs) and organic sulfur compounds like mercaptans (RSHs). HHCs and RCHs consume air in the reaction furnace, and if not fully combusted, can create problems for the downstream Claus catalytic stage.

After passing through one or more catalytic stages and condensing elemental sulfur, the remaining "tail gas" contains unreacted $H_2S$ and $SO_2$, plus $CO_2$, nitrogen, and water vapor. In many cases, the tail gas goes through a hydrogenation process to convert the residual $SO_2$ to $H_2S$. The reduced tail gas is often fed to an $H_2S$-selective amine unit so that virtually all of the $H_2S$ can be recycled to the front end of the Claus unit, while the majority of the $CO_2$ is passed to a thermal oxidizer and ultimately vented to the atmosphere.

U.S. Pat. No. 9,149,761, which is incorporated by reference herein in its entirety for all purposes, teaches the use of a non-selective amine in the tail gas cleanup unit (TGCU) to pick up both the $CO_2$ and $H_2S$, and slip the nitrogen to the incinerator. The concentrated acid gas is injected for sequestration. Not only does this reduce the $CO_2$ footprint of the unit, it effectively debottlenecks the MCP, and increases its sulfur recovery efficiency.

While the MCP has been used in numerous applications, not every situation is amenable to its use. For example, if the feed gas does not have a sufficiently high $H_2S$ concentration (i.e., <50% by volume), combustion in the Claus unit cannot be easily sustained. In this situation, recycling sulfur-containing compounds from the tail gas to the Claus unit will likely further dilute the $H_2S$ to make it even more difficult to run the Claus unit. What is needed is a method and apparatus to remove acid gas from a gas stream having a low concentration of $H_2S$.

It is desirable to provide an improved tail gas treating unit that reduces or minimizes the amount of $CO_2$ vented to the atmosphere. It is further desirable to substantially reduce $CO_2$ emissions from a tail gas treating unit by capturing increased levels of $CO_2$ from a tail gas treating unit, and injecting it into a reservoir, optionally for enhanced oil recovery operations.

SUMMARY OF THE INVENTION

In an aspect, a gas processing facility for processing a hydrocarbon gas stream including sulfurous components and carbon dioxide. An acid gas removal facility separates the hydrocarbon gas stream into a sweetened gas stream and an acid gas stream comprised primarily of hydrogen sulfide and carbon dioxide. A Claus sulfur recovery unit (SRU) that receives the acid gas stream and an air stream. The air stream is enriched with oxygen such that the air stream comprises between 22% and 100% oxygen. The SRU combusts the acid gas stream and the atmospheric air to thereby separate the acid gas stream into a liquid stream of elemental sulfur, and a tail gas stream comprising acid gas impurities. A tail gas treating unit includes a reducing gas generator (RGG) that combusts fuel gas and the tail gas stream with an air flow. The RGG sub-stoichiometrically combusts the fuel gas and tail gas stream with the air flow to produce an RGG outlet stream comprising hydrogen sulfide ($H_2S$) and carbon monoxide. A catalytic bed is configured to receive and hydrogenate the RGG outlet stream, thereby converting sulfur dioxide, carbonyl sulfide, mercaptans, and other sulfur species to a gaseous catalytic output stream comprising $H_2S$. A dehydration unit removes water from the gaseous catalytic output stream to produce a partially-dehydrated acid gas stream. A compressor station provides pressure to the partially-dehydrated acid gas stream for injection into a subsurface reservoir.

In another aspect, a gas processing facility is provided for processing a hydrocarbon gas stream including sulfurous components and carbon dioxide. An acid gas removal facility for separating the hydrocarbon gas stream into a sweetened gas stream and an acid gas stream comprised primarily of hydrogen sulfide and carbon dioxide. A Claus sulfur recovery unit (SRU) receives the acid gas stream and an air stream. The air stream is enriched with oxygen such that the air stream comprises between 22% and 100% oxygen. The SRU combusts the acid gas stream and the atmospheric air to thereby separate the acid gas stream into a liquid stream of elemental sulfur, and a tail gas stream comprising acid gas impurities. A tail gas treating unit includes a heat exchanger that receives the tail gas stream and an air flow. The tail gas stream and the air flow stream are heated through indirect heat exchange with a source of heat to produce a preheated tail gas stream. A catalytic bed hydrogenates the preheated tail gas stream, thereby converting sulfur dioxide, carbonyl sulfide, mercaptans, and other sulfur species to $H_2S$, thereby forming a gaseous catalytic output stream. A dehydration unit removes water from the gaseous catalytic output stream to produce a partially-dehydrated acid gas stream. A compressor station provides pressure to the partially-dehydrated acid gas stream for injection into a subsurface reservoir.

In another aspect, a method is provided for processing a hydrocarbon gas stream in a gas processing facility. The hydrocarbon gas stream includes sulfurous components and carbon dioxide. The hydrocarbon gas stream is separated into (i) a sweetened gas stream, and (ii) an acid gas stream comprised primarily of hydrogen sulfide and carbon dioxide. The acid gas stream and an air stream are received at a sulfur recovery unit (SRU). The air stream is enriched with oxygen such that the air stream comprises between 22% and 100% oxygen. The acid gas stream and the air stream are combusted in the SRU to thereby separate the acid gas stream into (i) a liquid stream of elemental sulfur, and (ii) a tail gas stream comprising acid gas impurities. The tail gas stream, an air flow, and a fuel gas are sub-stoichiometrically combusted to produce an outlet stream comprising hydrogen sulfide and carbon monoxide. The outlet stream is hydrogenated in a catalytic bed, thereby converting sulfur dioxide, carbonyl sulfide, mercaptans, and other sulfur species to a gaseous catalytic output stream comprising hydrogen sulfide. Water is removed from the gaseous catalytic output stream to produce a partially-dehydrated acid gas stream. The partially-dehydrated acid gas stream is compressed and injected into a subsurface reservoir.

In still another aspect, a method is provided for processing a hydrocarbon gas stream in a gas processing facility. The hydrocarbon gas stream includes sulfurous components and carbon dioxide. The hydrocarbon gas stream is separated into (i) a sweetened gas stream, and (ii) an acid gas stream comprised primarily of hydrogen sulfide and carbon dioxide. The acid gas stream and an air stream are received at a sulfur recovery unit (SRU). The air stream is enriched with oxygen such that the air stream comprises between 22% and 100% oxygen. The acid gas stream and the air stream are combusted in the SRU to thereby separate the acid gas stream into (i) a liquid stream of elemental sulfur, and (ii) a tail gas stream comprising acid gas impurities. The tail gas stream is heated through indirect heat exchange with a source of heat to produce a preheated tail gas stream. The preheated tail gas stream is hydrogenated in a catalytic bed, thereby converting sulfur dioxide, carbonyl sulfide, mercaptans, and other sulfur species to a gaseous catalytic output stream comprising $H_2S$. Water is removed from the gaseous catalytic output stream to produce a partially-dehydrated acid gas stream. The partially-dehydrated acid gas stream is pressurized and injected into a subsurface reservoir.

BRIEF DESCRIPTION OF THE DRAWINGS

So that the manner in which the present invention can be better understood, certain illustrations and/or flow charts are appended hereto. It is to be noted, however, that the drawings illustrate only selected embodiments of the inventions and are therefore not to be considered limiting of scope, for the inventions may admit to other equally effective embodiments and applications.

DETAILED DESCRIPTION

Definitions

Figure 1:
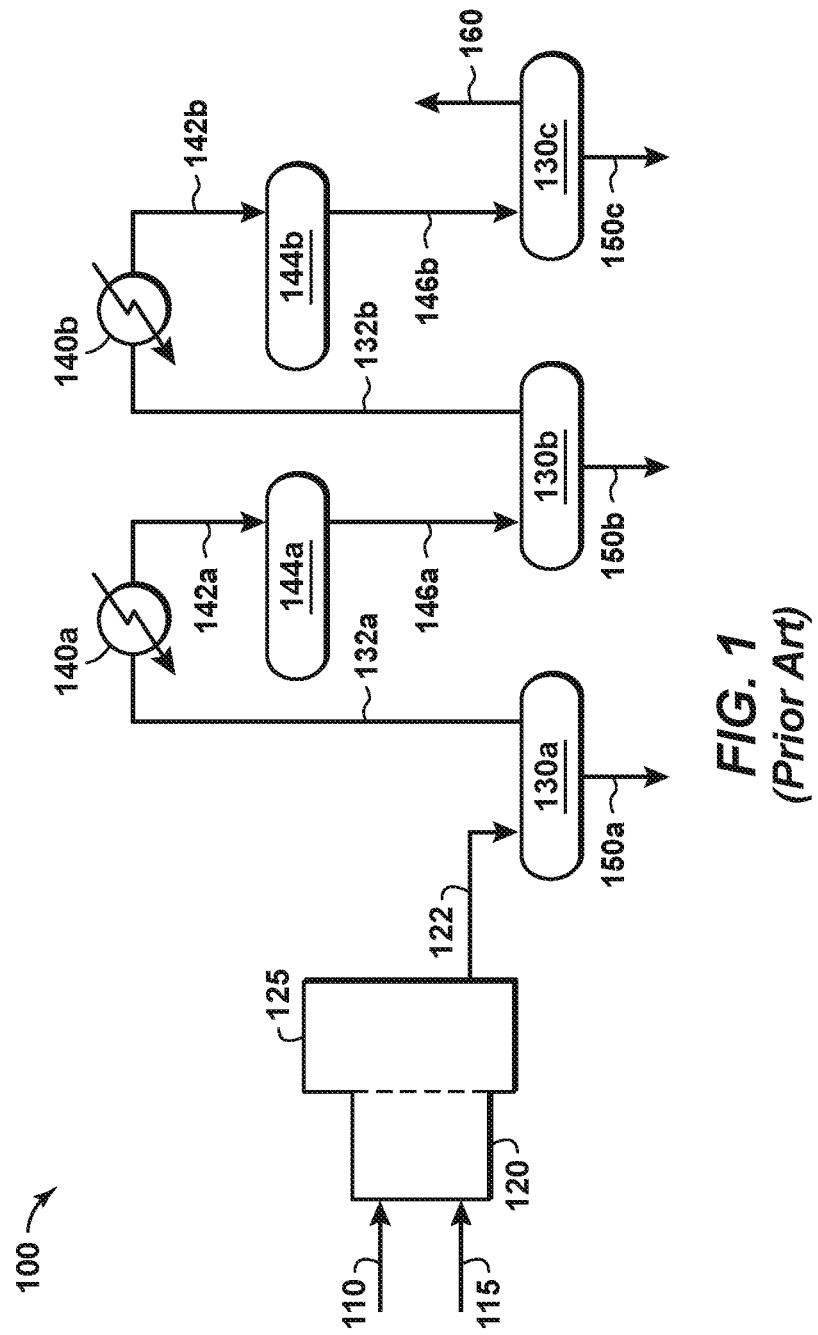
FIG. 1 is a schematic view of a known gas processing facility for carrying out a sulfur removal process in accordance with a Claus reaction.

Various specific aspects, embodiments, and versions will now be described, including definitions adopted herein. Those skilled in the art will appreciate that such aspects, embodiments, and versions are exemplary only, and that the invention can be practiced in other ways. Any reference to the "invention" or "aspect of the disclosure" may refer to one or more, but not necessarily all, of the aspects defined by the claims. The use of headings is for purposes of convenience only and does not limit the scope of the present invention. For purposes of clarity and brevity, similar reference numbers in the several Figures represent similar items, steps, or structures and may not be described in detail in every Figure.

All numerical values within the detailed description and the claims herein are modified by "about" or "approximately" the indicated value, and take into account experimental error and variations that would be expected by a person having ordinary skill in the art.

As used herein, the term "natural gas" refers to a multi-component gas obtained from a crude oil well (associated gas) or from a subterranean gas-bearing formation (non-associated gas). The composition and pressure of natural gas can vary significantly. A typical natural gas stream contains methane ($C_1$) as a significant component. The natural gas stream may also contain ethane ($C_2$), higher molecular weight hydrocarbons, and one or more acid gases. The natural gas may also contain minor amounts of contaminants such as water, nitrogen, iron sulfide and wax.

As used herein, the term "acid gas" means any gas that dissolves in water producing an acidic solution. Nonlimiting examples of acid gases include hydrogen sulfide (HS), carbon dioxide ($CO_2$), sulfur dioxide ($SO_2$), carbon disulfide ($CS_2$), carbonyl sulfide (COS), mercaptans, or mixtures thereof.

"Flue gas" means any gas stream generated as a by-product of hydrocarbon combustion.

"Compressor" refers to a device for compressing a gaseous fluid, including gas-vapor mixtures or exhaust gases, and includes pumps, compressor turbines, reciprocating compressors, piston compressors, rotary vane or screw compressors, and devices and combinations capable of compressing a gas.

"Enhanced oil recovery" or "EOR" refers to the processes for enhancing the recovery of hydrocarbons from subterranean reservoirs. Techniques for improving displacement efficiency or sweep efficiency may be used for the exploitation of an oil or gas field by introducing displacing fluids or gas into injection wells to drive hydrocarbons through the reservoir to producing wells.

As used herein, the terms "catalytic" or "catalyst" relate to a material which under certain conditions of temperature and/or pressure increases the rate of specific chemical reactions or acts as a chemisorbent for specific components of a feed stream.

As used herein, the term "fluid" refers to gases, liquids, and combinations of gases and liquids, as well as to combinations of gases and solids, and combinations of liquids and solids.

"Flashing" means depressurizing a liquid through an expansion device or vessel with the conversion of a portion of the liquid to the vapor phase.

As used herein, "lean" and "rich," with respect to the absorbent liquid removal of a selected gas component from a gas stream, are relative, merely implying, respectively, a lesser or greater degree or extent of loading or content of the selected gas component, and do not necessarily indicate or require, respectively, either that the absorbent liquid is totally devoid of the selected gaseous component, or that it is incapable of absorbing more of the selected gas component. In fact, it is preferred, as will be evident hereinafter, that the so called "rich" absorbent liquid produced in contactor retains residual absorptive capacity. Conversely, a "lean" absorbent liquid will be understood to be capable of additional absorption, and may retain a minor concentration of the gas component being removed.

"Sour gas" means a gas containing undesirable quantities of acid gas, e.g., 55 parts-per-million by volume (ppmv) or more, or 500 ppmv, or 5 percent by volume or more, or 15 percent by volume or more. At least one example of a "sour gas" is a gas having from about 2 percent by volume or more to about 7 percent by volume or more of acid gas.

The term "industrial plant" refers to any plant that generates a gas stream containing at least one hydrocarbon or an acid gas. One nonlimiting example is a coal-powered electrical generation plant. Another example is a cement plant that emits $CO_2$ at low pressures.

The term "liquid solvent" means a fluid in substantially liquid phase that preferentially absorbs acid gases, thereby removing or "scrubbing" at least a portion of the acid gas components from a gas stream. The gas stream may be a hydrocarbon gas stream or other gas stream, such as a gas stream having hydrogen sulfide.

"Sweetened gas stream" refers to a fluid stream in a substantially gaseous phase that has had at least a portion of acid gas components removed.

As used herein, the term "hydrocarbon" refers to an organic compound that includes primarily, if not exclusively, the elements hydrogen and carbon. Hydrocarbons generally fall into two classes: aliphatic, or straight chain hydrocarbons, and cyclic, or closed ring, hydrocarbons including cyclic terpenes. Examples of hydrocarbon-containing materials include any form of natural gas, oil, coal, and bitumen that can be used as a fuel or upgraded into a fuel.

As used herein, the term "hydrocarbon fluids" refers to a hydrocarbon or mixtures of hydrocarbons that are gases or liquids. For example, hydrocarbon fluids may include a hydrocarbon or mixtures of hydrocarbons that are gases or liquids at formation conditions, at processing conditions or at ambient conditions (15° C. and 1 atm pressure). Hydrocarbon fluids may include, for example, oil, natural gas, coal bed methane, shale oil, pyrolysis oil, pyrolysis gas, a pyrolysis product of coal, and other hydrocarbons that are in a gaseous or liquid state.

As used herein, the term "subsurface" refers to geologic strata occurring below the earth's surface.

The general process for a Claus sulfur recovery operation is shown schematically in FIG. 1, in which a sulfur recovery plant 100 is depicted. The sulfur recovery plant 100 operates to convert hydrogen sulfide and other sulfurous components into elemental sulfur. Elemental sulfur is shown being incrementally deposited from the plant 100 at lines 150a, 150b, 150c.

To conduct the Claus process, an acid gas stream 110 containing $H_2S$ is directed into the plant 100, and specifically, is introduced into a reactor furnace 120 along with a stream of air 115. There, one-third of the hydrogen sulfide (and other sulfurous components) is burned with the air 115 to form $SO_2$ (and some elemental sulfur) according to the first reaction set forth above. The reactor furnace 120 operates at pressures around 10 to 15 psig and typically at temperatures above 850° C. The reactor furnace 120 works with a waste heat boiler 125 as part of the "thermal section" of the Claus process. The waste heat boiler 125 recovers heat from the reactor 120 to generate steam. Sulfur and water vapor are generated according to the second reaction above. In FIG. 1, a combination of sulfur and water vapor is shown leaving the waste heat boiler 125 at line 122. The sulfur and water vapor in line 122 are then directed into a first condenser 130a. In the condenser 130a, elemental sulfur is condensed out of the gas phase. Sulfur is released from the first condenser 130a in a first sulfur line 150a. The sulfur in sulfur line 150a is initially in a molten liquid phase, but converts to a solid phase during cooling in a downstream process.

The Claus reaction does not convert all $H_2S$ and $SO_2$ into elemental sulfur. To recover more sulfur, the unreacted $H_2S$ and $SO_2$ (along with $CO_2$, $N_2$, and $H_2O$ vapor) are released from the first condenser 130a through an overhead line 132a and are heated in reheater 140a above the sulfur dew point. A heated stream of $H_2S$, $SO_2$, and other gases is released from the reheater 140a through line 142a and is introduced into a converter, or "reactor" 144a containing alumina and/or titania catalyst. The catalyst facilitates further reaction between the $H_2S$ and $SO_2$ to form more elemental sulfur, which passes through line 146a into a second condenser 130b. Elemental sulfur is condensed out of the gas phase of line 146a and is released through second sulfur line 150b as a molten liquid. This sequence of condensing sulfur, reheating gas, and passing it to a catalytic reactor may optionally be repeated one or two more times to reach a desired level of sulfur recovery. In FIG. 1, a second reheater is seen at 140*b*, a second stream of heated $H_2S$ and $SO_2$ is seen at 142*b*, a second reactor is seen at 144*b*, and a third condenser is seen at 130*c*. The third condenser 130*c* condenses out a third sulfur line 150*c*.

Even after passing through the catalytic stages, there may be too much unreacted $H_2S$ and $SO_2$. Typically, 1 to 3 percent by volume of these gases will remain, but this percentage may be considered too high to incinerate and release into the atmosphere. This remaining sulfurous gas stream is referred to as "tail gas." The tail gas will contain not only unreacted $H_2S$ and $SO_2$, but may also contain $CO_2$ and $N_2$ from the combustion air. The tail gas is shown at line 160 coming out of the third condenser 130*c*. Of course, the tail gas may be line 132*b* if the second reheater 140*b*, second reactor 144*b*, and third condenser 130*c* are not used.

Figure 2:
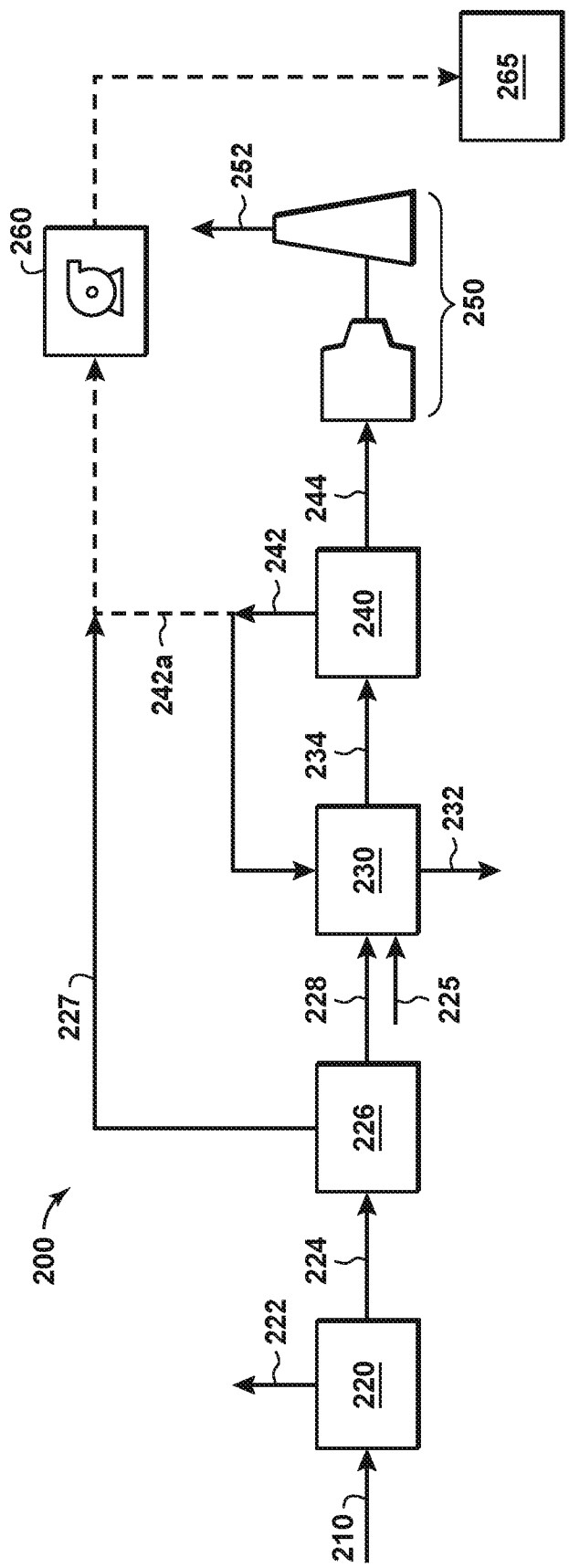
FIG. 2 is a schematic view of a known gas processing facility for removing acid gas components from a raw natural gas stream.

Some governmental entities require a greater than 97% or 98% sulfur recovery efficiency. To achieve this level of sulfur removal, the tail gas 160 must be treated. This is done in a tail gas treating unit, or "TGTU." A number of "tail gas" treatment options have been devised for a TGTU. FIG. 2 schematically shows a known gas treating and sulfur recovery facility 200. The facility 200 includes an acid gas removal facility 220 followed by a Claus sulfur recovery unit 230. The facility 200 also includes a tail gas treating unit 240. In FIG. 2, a raw gas stream 210 is first shown entering an acid gas removal facility 220. The gas stream 210 may be, for example, raw natural gas from a hydrocarbon recovery operation. For natural gas treating applications it is preferred that the gas stream 210 have a pressure of at least 100 psig, and more typically at least 500 psig. While it is generally contemplated that at least a portion of the gas pressure is due to the pressure of the gas stream 210 entering the gas treatment facility 200 from a subsurface reservoir, the pressure may be boosted using one or more compressors (not shown).

The raw natural gas stream 210 typically has undergone dehydration before entering the acid gas removal facility 220. This may be done through the use of glycol. It is also desirable to keep the gas stream 210 clean to prevent foaming of liquid solvent during the acid gas treatment process in the acid gas removal system 220. Therefore, the raw natural gas stream 210 typically is passed through an inlet separator and coalescer (not shown) to filter out impurities such as brine and drilling fluids. The separator and coalescer will also remove any condensed hydrocarbons. Some particle filtration may also take place.

The gas stream 210 contains at least one hydrocarbon gas component, principally methane. In addition, the gas stream 210 contains at least one acid gas. Examples of an acid gas are hydrogen sulfide and carbon dioxide. A natural gas stream in a particularly "sour" field may have, for example, 10 to 40% $H_2S$ and/or 5 to 10% $CO_2$ along with methane and possibly heavier hydrocarbon components such as ethane or propane. The acid gas removal facility 220 operates to separate out the acid gas components from the hydrocarbon gases. This may done, for example, through the various solvent reaction processes discussed above. Alternatively, a cryogenic separation process may be employed, such as the use of the Controlled Freeze Zone™ (CFZ) process created and used by ExxonMobil Upstream Research Company. The CFZ™ process takes advantage of the propensity of carbon dioxide to form solid particles by allowing frozen $CO_2$ and $H_2S$ particles to form within an open portion of a distillation tower, and then capturing the particles on a melt tray. As a result, a clean methane stream (along with any nitrogen or helium present in the raw gas) is generated at the top of the tower, while a cold liquid $CO_2/H_2S$ stream is generated at the bottom of the tower. Certain aspects of the CFZ™ process and associated equipment are described in U.S. Pat. Nos. 4,533,372; 4,923,493; 5,062,270; 5,120,338; and 6,053,007.

In FIG. 2, a sweetened gas stream 222 exits the acid gas removal facility 220 overhead. An acid gas stream 224 exits the bottom of the acid gas removal facility 220. The acid gas stream 224 contains primarily carbon dioxide and hydrogen sulfide. The acid gas stream may enter an acid gas enrichment (AGE) unit 226, in which $CO_2$ is separated from the acid gas stream according to known principles. A $CO_2$-rich stream 227 exits the AGE unit 226 for further processing as will be explained herein. An enriched acid gas stream 228 also exits the AGE unit 226. Enriched acid gas stream 228 has a higher concentration of $H_2S$ than acid gas stream 224, thereby making further acid gas processes more efficient. The enriched acid gas stream 228—or, if an AGE unit is not used, the acid gas stream 224—enters a Claus sulfur recovery facility 230. The Claus sulfur recovery facility 230 serves as a SRU and may be identified herein as such. As discussed above in connection with FIG. 1, the Claus SRU 230 combusts the acid gas stream and an atmospheric air stream 225 to convert sulfurous components in the acid gas stream into elemental sulfur. In FIG. 2, an elemental sulfur stream 232 exits the Claus SRU 230. A tail gas stream 234 also exits the Claus SRU 230.

The tail gas stream 234 is directed to a TGTU 240 and "cleaned" therein, i.e., the proportion of hydrogen sulfide in the tail gas stream is reduced. In the arrangement of FIG. 2, hydrogen sulfide 242 removed from the tail gas stream is directed from the TGTU 240 and recycled back to the front end of the Claus SRU 230. The remaining products, consisting primarily of nitrogen, carbon dioxide, and traces of hydrogen sulfide, are directed to an incinerator 250 through line 244 where they are burned and vented to the atmosphere through vent line 252. Alternatively or additionally, the hydrogen sulfide 242 may be diverted through line 242*a* and compressed in a compressor 260 to be injected into a subterranean formation or reservoir 265 for pressure maintenance, enhanced oil recovery, and/or carbon capture/sequestration purposes. $CO_2$-rich stream 227 may be combined with line 242*a* and likewise compressed and injected.

Figure 3:
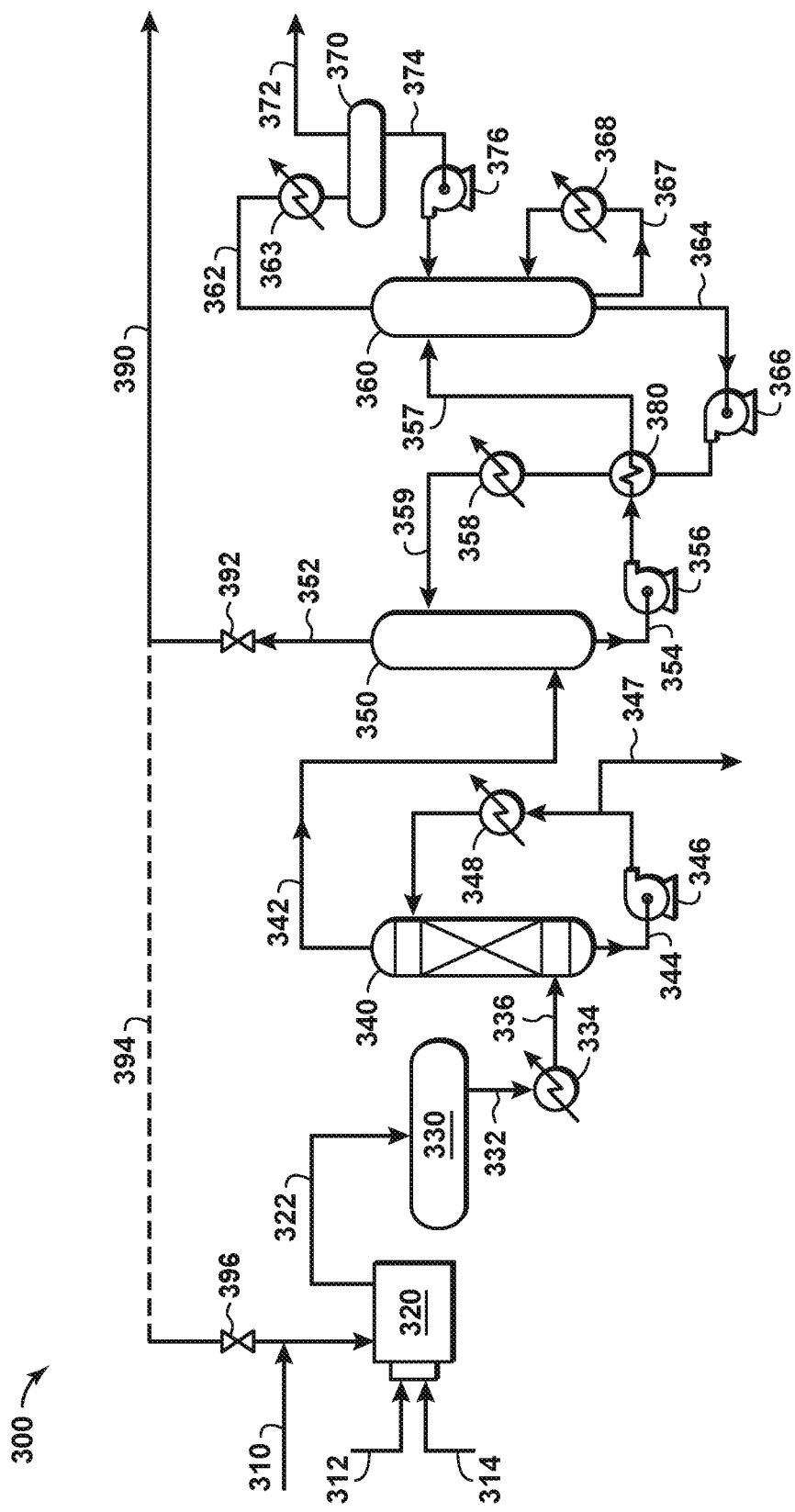
FIG. 3 is a schematic view of a known tail gas treating unit (TGTU).

As noted, different tail gas treatment options have been devised for a TGTU. In one aspect, the tail gas may be hydrogenated to convert the $SO_2$ and mercaptans in the tail gas stream to $H_2S$. This process is shown and described below in connection with FIG. 3, which provides a schematic view of a tail gas treating unit 300, as known in the gas processing industry. The output of the process is $H_2S$ with some amount of $CO_2$, which is recycled back to the Claus SRU 230. However, most $CO_2$ necessarily travels through the TGTU 240 and passes to the incinerator 250 and is vented to the atmosphere along with $N_2$. A vent line is again shown at 252.

The TGTU 300 receives a tail gas stream 310, fuel gas through line 312, and a sub-stoichiometric air flow through line 314. The tail gas stream 310, the fuel gas 312 and the air flow 314 are introduced into a reducing gas generator (RGG) 320. The RGG 320 performs a sub-stoichiometric combustion of fuel gas to generate the hydrogen needed for the reduction of $SO_2$ and mercaptans to $H_2S$. The RGG 320 partially oxidizes the hydrocarbon components of the fuel gas to generate carbon monoxide and hydrogen. The hydrogen sulfide and carbon monoxide exit the RGG 320 through line 322 and are directed through a catalytic bed 330, which may be a cobalt-molybdenum (Co—Mo) catalytic bed. The catalytic bed 330 facilitates the hydrogenation reactions. Together, the RGG 320 and the catalytic bed 330 hydrogenate the tail gas in the tail gas stream 310 to convert the $SO_2$ and mercaptans in the tail gas stream 310 to $H_2S$.

The RGG 320 introduces more nitrogen, $CO_2$, and water vapor into the process. In addition, carbon monoxide is generated in the RGG 320. The carbon monoxide reacts with $H_2O$ on the sulfided Co—Mo catalyst bed 330 to generate more hydrogen and $CO_2$ via a known water-gas shift reaction:

$$CO + H_2O \rightarrow CO_2 + H_2$$

The presence of additional hydrogen assists in the conversion of $SO_2$ to $H_2S$ and water vapor.

An $H_2S$-containing gaseous stream is released from the catalyst bed 330 through line 332. The $H_2S$ stream is preferably cooled through a heat exchanger 334. A cooled $H_2S$-containing gaseous stream leaves the heat exchanger 334 as stream 336. The cooled $H_2S$-containing stream 336 then enters a quench tower 340, which operates primarily to remove water generated by the Claus reaction. Much of the excess water vapor is condensed and removed through line 344 as quench water. The quench water is passed through a pump 346 and cooled in a heat exchanger 348. Part of the quench water from line 344, now cooled, is reintroduced into the quench tower 340 near the top of the tower 340. The remaining water from line 344 is removed through a bleed-off line 347. Excess sour water may be removed through line bleed-off line 347 and used elsewhere in the tail gas treating unit 300 for cooling or, after stripping of acidic components, for agricultural purposes.

The quench tower 340 releases a cooled tail gas stream 342. Here, the cooled tail gas stream 342 comprises $H_2S$, $N_2$, $CO_2$, $H_2$, and water vapor. To recover the $H_2S$, the cooled tail gas stream in line 342 is then contacted with an amine in an absorber 350, which may use an $H_2S$-selective amine. The amine is usually methyl diethanol amine (MDEA) or an amine from the Flexsorb® family of amines discussed above. The amine captures the great majority of the $H_2S$, along with some level of $CO_2$. The amine originates at a solvent tank (not shown) proximate the absorber 350. Movement of the amine into the absorber 350 is aided by a pump that moves the amine into the absorber 350 under suitable pressure. The pump may, for example, boost pressure of the amine to 25 psig or higher.

The absorber 350 operates on the basis of a counter-current flow scheme. In this respect, acid gases are directed from line 342 and through the absorber 350 in one direction, while chemical solvent is directed through the absorber 350 in the opposite direction. The chemical solvent is introduced into the absorber 350 through line 359. As the two fluid materials interact, the downflowing solvent absorbs $H_2S$ from the upflowing sour gas to produce a "rich" solvent, that is, amine with the absorbed $H_2S$ and some incidental $CO_2$. The rich solvent passes through a bottom line 354. The rich solvent in bottom line 354 preferably is taken through a booster pump 356 and heat-exchanged through a heat exchanger 380. Heat exchanging is carried out with a regenerated solvent line 364 from a regenerator vessel 360. This allows the rich solvent to be pre-heated. The rich solvent then moves forward through line 357 into the regenerator vessel 360, where the amine is regenerated by separating it from the hydrogen sulfide in line 357 for re-use. In an aspect, the regenerator vessel 360 is a large-diameter vessel that operates at a pressure of about 15 to 25 psig. The regenerator vessel 360 defines a stripper portion typically comprising trays, packings or other internals (not shown) above a reboiler. A heat source 368 is provided to the reboiler to generate vapor traffic within the regenerator vessel 360. The reboiler typically uses steam as its heat source to boil off water and $H_2S$ (and $CO_2$) from the amine. The regenerator vessel 360 allows the rich solvent from line 357 to cascade down through trays or other internals. A portion of the regenerated amine is taken through bottom line 367. From there, the portion of regenerated amine is reheated using a heat exchanger 368, and is then reintroduced to the regenerator vessel 360. However, a majority of the regenerated amine is dropped through a bottom amine line 364. The bottom amine line 364 contains a lean solvent stream, which is at a temperature of about 265° F. The bottom amine line 364 carries lean amine through a booster pump 366. From there, the amine passes through the heat exchanger 380 mentioned above, where it warms the rich solvent from line 354. At the same time, thermal contact with the rich solvent from line 354 serves to partially cool the lean amine in bottom amine line 364. The cooled amine may be further cooled through a heat exchanger 358. The cooled amine is then carried to the top of the absorber vessel 350 through line 359.

The absorber vessel 350 releases an overhead by-products line 352. The gas in the overhead by-products line 352 includes $N_2$, water vapor, and some of the $CO_2$. These overhead by-products in line 352 are delivered to a release line 390, which takes the overhead by-products to an incinerator. Thus, line 390 is comparable to line 244 from FIG. 2, which shows gases being released from the tail gas treating unit 240 and directed to an incinerator 250. A valve 392 may be employed to control the flow of gases to the incinerator 250.

It is noted that the by-products in line 352 may and almost certainly will contain some $H_2S$. $H_2S$ that slips past the absorption step provided by the absorber vessel 350 usually goes to the incinerator with the $CO_2$ and other gases, and eventually counts against the allowable $SO_2$ emission limit. Those of ordinary skill in the art will understand that burning $H_2S$ creates $SO_2$. It is, however, optional, to bypass the incinerator, particularly during start-up and catalyst sulfiding procedures, and to route the gases in line 352 back to the RGG 320, as indicated by dashed line 394. Valve 396 is provided to control the bypass flow through line 394. When the valve 396 is open, the by-products from the absorber vessel 350 (from line 352 and then line 394) are merged with the tail gas stream 310. A recycle blower (not shown) may be placed in line 352 or line 394 to assist this gas to be recycled as described.

Returning to the regenerator vessel 360, the regenerator vessel 360 also has an overhead line 362 which releases the hydrogen sulfide (and incidental $CO_2$) that flashes from the amine in the regenerator vessel 360. The sour gas in line 362 will inevitably contain trace amounts of amine and water. Therefore, the $H_2S$-rich sour gas is preferably carried through overhead line 362 to a heat exchanger 363 where it is cooled, and then dropped to a small condensing vessel 370. The heat exchanger 363 may be an air fan cooler or may be a heat exchanger using fresh water or sea water. Cooling the $H_2S$-rich sour gas in line 362 serves to knock out water, which helps to minimize the required water make-up.

The condensing vessel 370 produces an $H_2S$-rich acid gas. The $H_2S$-rich acid gas is released from the condensing vessel 370 through overhead line 372. In the known TGTU 300, the $H_2S$-rich acid gas is recycled back to the front of the Claus sulfur recovery unit. This is represented more fully at line 242 in FIG. 2, where the $H_2S$-rich acid gas is delivered back to the Claus SRU 230. Water and amine drop from the condensing vessel 370 through bottom line 374. Together, the water and amine are pressurized in a pump 376 and reintroduced into the top of the regenerator vessel 360. Some of the water is re-vaporized, but most water travels down the regenerator vessel 360 with the lean amine, and is thus recycled. After desorbing both $H_2S$ and $CO_2$, the rich solvent stream 354 is then regenerated. This produces an acid gas comprised of solvent plus $H_2S$ and $CO_2$, but substantially free of nitrogen and other light gases.

As an alternative means of capturing $CO_2$ to avoid venting the $CO_2$ into the atmosphere, and as a further improvement to the tail gas treating unit 300, the incinerator 250 may use a catalytic incineration process. This is as opposed to a fuel gas combustion process. A catalytic incineration process requires lower temperatures to combust the $H_2S$ along with any residual hydrocarbons, such as from an acid gas enrichment unit. Some preheating of the overhead by-products stream 244 is done, air is added, and the mixture is flowed to a catalyst bed. The catalyst facilitates oxidation of hydrocarbons to $CO_2$, and water vapor and $H_2S$ to $SO_2$. Those of ordinary skill in the art will understand that a catalytic incineration system would preferably be designed to handle "upsets" from the TGTU that may result in temporary increases in the level of $H_2S$ flowing to it.

According to disclosed aspects, $CO_2$ emissions may be reduced using principles of acid gas enrichment (AGE). In some gas processing applications, the $H_2S$ content of the original acid gas (bottom acid gas stream from line 224 in FIG. 2) is too low to make the conventional Claus SRU function properly. The Claus furnace 220 generally requires a sulfurous component content of at least 40% for "straight through" Claus design, and more preferably greater than 50% $H_2S$. In these cases, it is known to "enrich" the acid gas with respect to $H_2S$ by removing $CO_2$ from the acid gas stream in line 224, and delivering the $CO_2$-rich stream directly to the incinerator 250. In one or more embodiments, the acid gas line 242 is directed to an acid gas enrichment facility thereby generating a "cleaner" $CO_2$. However, if the $H_2S$ concentration is too low to sustain combustion of the acid gas in the Claus unit even with the benefit of acid gas injection, oxygen enrichment may be used. According to disclosed aspects, an air source in combination with an oxygen source may be employed to create a mixed air stream containing between 21% and 100% mol (volume) of oxygen. Such a mixed air stream reduces the volume of inert gas to the burner in a sulfur recovery unit or other combustion device, thereby stabilizing the flame and ensuring proper combustion therein. Because increasing the amount of oxygen in the Claus unit reduces the amount of nitrogen, the volume and concentration of $CO_2$ in the combusted/reacted gas is increased, thereby increasing the availability and desirability of the $CO_2$ for carbon capture and sequestration (CCS) of the outlet gas. By way of example, if a field produces 1 billion cubic feet of feed gas per day with a 5% $CO_2$ content, a 90% recovery would capture nearly 1 million tons of $CO_2$ per year. Considering the large number of existing Claus units processing gas with at least some level of $CO_2$, this could amount to many million tons per year of additional $CO_2$ captured. Furthermore, the absence of nitrogen makes a later acid gas injection (AGI) operation easier because it is easier to condense the acid gas into a dense phase, that is, a substantially liquid phase. Hydrostatic head of the condensed acid gas, now substantially in liquid phase, may be used to advantage in the wellbores to help push it into the reservoir. Lastly, an acid gas stream including nitrogen typically requires much higher pressures to be miscible with reservoir oil; therefore, a nitrogen-free or nitrogen-reduced acid gas stream is especially suitable to be used for enhanced oil recovery.

Disclosed aspects facilitate removal, recovery and sequestration of $CO_2$ from an $H_2S$-containing feed gas. For example, for the manufacture of liquefied natural gas (LNG), effectively all $H_2S$ and $CO_2$ must be removed from the natural gas prior to liquefaction. The $H_2S:CO_2$ ratio of the concentrated acid gas would essentially be that found in the raw natural gas. In most cases, the $H_2S:CO_2$ ratio is be too small to sustain combustion in a modified Claus process (MCP) furnace. Instead of relying on Acid Gas Enrichment as described herein, the disclosed aspects of oxygen enrichment may be used.

Figure 4:
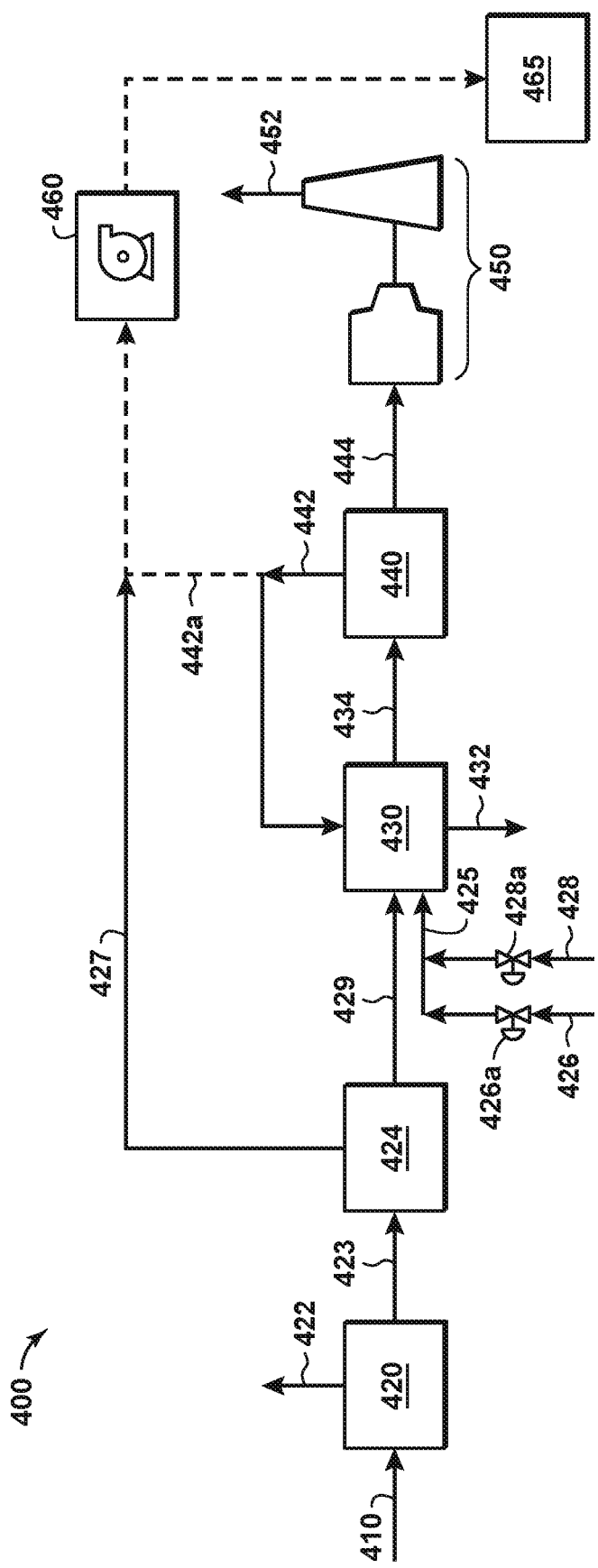
FIG. 4 is a schematic view of a gas processing facility according to disclosed aspects.

FIG. 4 schematically depicts a gas treating and sulfur recovery facility 400 according to aspects of the disclosure. The facility 400 includes an acid gas removal facility 420 followed by a Claus sulfur recovery unit 430. The facility 400 also includes a tail gas treating unit 440. In FIG. 4, a raw gas stream 410 enters the acid gas removal facility 420. The raw gas stream 410 may be, for example, raw natural gas from a hydrocarbon recovery operation. The raw gas stream 410 may have a pressure of at least 100 psig, and more typically at least 500 psig, and one or more compressors (not shown) may boost the pressure of the raw gas stream to these levels if needed. The raw gas stream 410 may be subject to dehydration operations before entering the acid gas removal facility 420. The raw gas stream may be passed through an inlet separator and coalescer (not shown) to filter out impurities such as brine, drilling fluids, and condensed hydrocarbons. The separator and coalescer will also remove any condensed hydrocarbons. Some particle filtration may also take place.

The raw gas stream 410 contains at least one hydrocarbon gas component, principally methane. In addition, the raw gas stream 410 contains at least one acid gas, such as hydrogen sulfide and carbon dioxide. A natural gas stream in a particularly "sour" field may have, for example, 10 to 40% $H_2S$ and/or 5 to 10% $CO_2$ along with methane and possibly heavier hydrocarbon components such as ethane or propane. The acid gas removal facility 420 operates to separate out the acid gas components from the hydrocarbon gases. This may done, for example, through the various solvent reaction processes or cryogenic separation processes discussed above.

In FIG. 4, a sweetened gas stream 422 exits the acid gas removal facility 420. An acid gas stream 423 also exits the acid gas removal facility 420. The acid gas stream 423 contains primarily carbon dioxide and hydrogen sulfide. The acid gas stream 423 may enter an acid gas enrichment (AGE) unit 424, in which $CO_2$ is separated from the acid gas stream according to known principles. A $CO_2$-rich stream 427 exits the AGE unit 424 for further processing as will be explained herein. An enriched acid gas stream 429 also exits the AGE unit 424. Enriched acid gas stream 429 has a higher concentration of $H_2S$ than acid gas stream 423, thereby making further acid gas processes more efficient. The enriched acid gas stream 429—or, if an AGE unit is not used, the acid gas stream 423—enters a Claus sulfur recovery facility 430. The Claus sulfur recovery facility 430 serves as a SRU and may be identified herein as such. The Claus SRU 430 combusts the acid gas stream 423 and a mixed air stream 425 to convert sulfurous components in the acid gas stream to into elemental sulfur. The mixed air stream 425 is a variable combination of a sub-stoichiometric air flow through line 426 and an oxygen stream 428. Valves 426a, 428a may be used to mix the air flow 426 and the oxygen stream 428 so the mixed air stream contains an enriched proportion of oxygen when compared to atmospheric air, i.e., between 23 mol % and 100 mol % (volume) oxygen, or between 35 mol % and 90 mol % (volume) oxygen, or between 45 mol % and 80 mol % (volume) oxygen, or between 55 mol % and 70 mol % (volume) oxygen, or between 90 mol % and 100 mol % (volume) oxygen, or between 95 mol % and 100 mol % (volume) oxygen, or 100 mol % (volume) oxygen. In the aspect described in FIG. 4, the oxygen proportion is 100%. An elemental sulfur stream 432 exits the Claus SRU 430. A tail gas stream 434 also exits the Claus SRU 430.

The tail gas stream 434 is directed to a tail gas treating unit (TGTU 440) and "cleaned" therein, i.e., the proportion of hydrogen sulfide in the tail gas stream is reduced. In the arrangement of FIG. 4, hydrogen sulfide 442 removed from the tail gas stream may be directed from the TGTU 440 and recycled back to the front end of the Claus SRU 430. Alternatively or additionally, the hydrogen sulfide 442 may be diverted through line 442a and compressed in a compressor 460 to be injected into a subterranean formation or reservoir 465 for pressure maintenance, enhanced oil recovery, and/or carbon capture/sequestration purposes. $CO_2$-rich stream 427 may be combined with line 442a and likewise compressed and injected. The remaining products, consisting primarily of carbon dioxide, traces of hydrogen sulfide, and no nitrogen (because of 100% oxygen enrichment), may be directed to an incinerator 450 through line 444 where they are burned and vented to the atmosphere through vent line 452.

Figure 5:
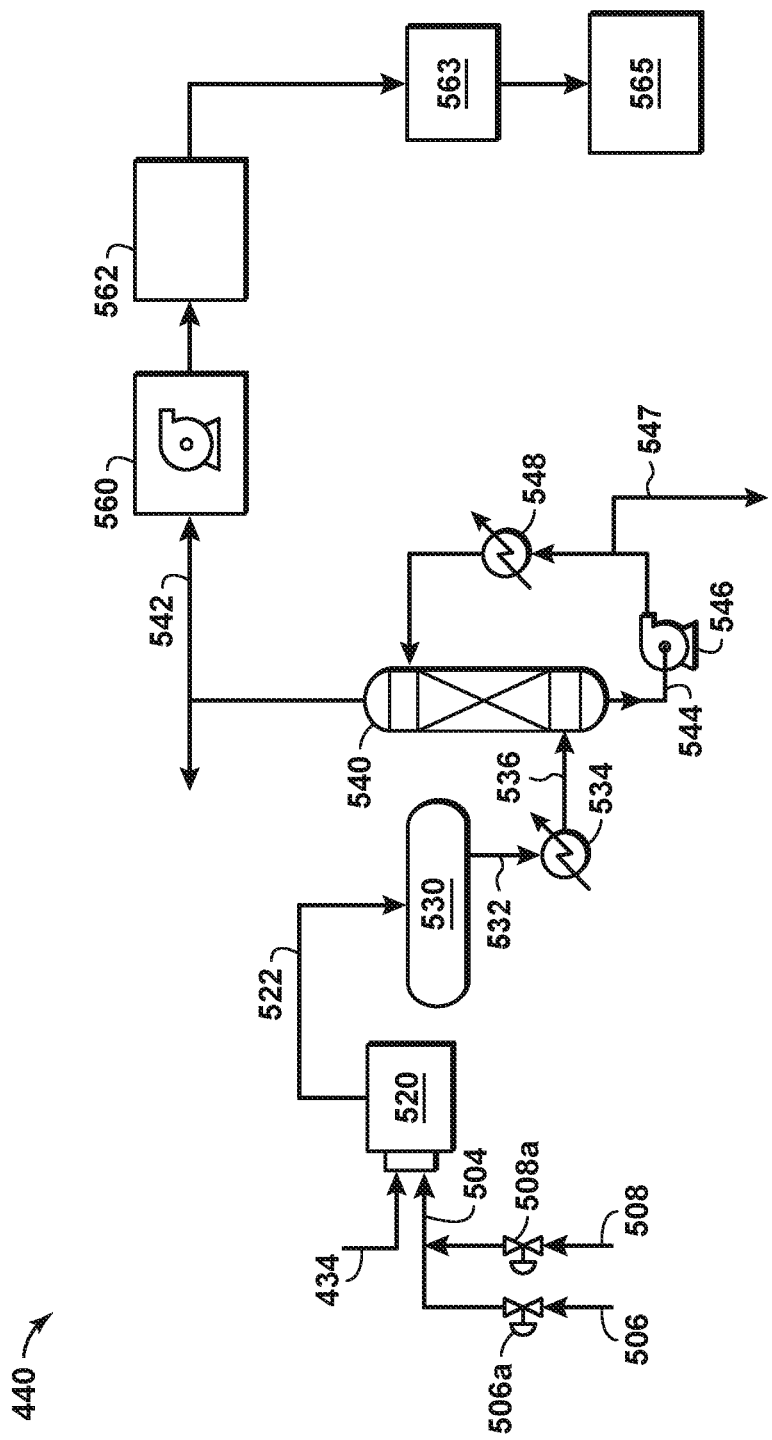
FIG. 5 is a schematic view of a TGTU according to disclosed aspects.

FIG. 5 depicts the tail gas treating unit (TGTU) 440 according to disclosed aspects in further detail. TGTU includes a reducing gas generator (RGG) 520 and one or more catalytic beds 530, according to one aspect of the disclosure. RGG 520 receives the tail gas stream 434 and a mixed air stream 504. The mixed air stream 504 is typically atmospheric air, but in an aspect it is a variable combination of a sub-stoichiometric atmospheric air flow through line 506 and an oxygen stream 508. Valves 506a, 508a may be used to mix the air flow 506 and the oxygen stream 508 so the mixed air stream contains an enriched proportion of oxygen when compared to atmospheric air, i.e., between 23 mol % and 100 mol % (volume) oxygen, or between 35 mol % and 90 mol % (volume) oxygen, or between 45 mol % and 80 mol % (volume) oxygen, or between 55 mol % and 70 mol % (volume) oxygen, or between 90 mol % and 100 mol % (volume) oxygen, or between 95 mol % and 100 mol % (volume) oxygen, or 100 mol % (volume) oxygen. In the aspect described in FIG. 5, the oxygen proportion may be 100%. RGG 520 performs a sub-stoichiometric combustion of the fuel gas to generate the hydrogen needed for the reduction of $SO_2$ and mercaptans to $H_2S$. The RGG 520 partially oxidizes the hydrocarbon components of the tail gas stream to generate carbon monoxide and hydrogen, which along with hydrogen sulfide and carbon monoxide, exit the RGG 520 through line 522. The RGG 520 also introduces $CO_2$, and water vapor into the process; however, the mixed air stream 504 comprises 100% oxygen (as does the feed to the MCP), and therefore no nitrogen is present in line 522. Line 522 is directed through a catalytic bed 530, which may include one or more cobalt-molybdenum (Co—Mo) catalytic beds. Together, the RGG 520 and the catalytic bed 530 hydrogenate the $SO_2$ and mercaptans in the fuel gas to $H_2S$. The carbon monoxide reacts with $H_2O$ on the sulfided Co—Mo catalyst bed 530 to generate more hydrogen and $CO_2$. The presence of additional hydrogen assists in the conversion of $SO_2$ to $H_2S$ and water vapor.

A gaseous catalytic output stream 532 is released from the catalytic bed 530. The gaseous catalytic output stream 532, which contains $H_2S$, $CO_2$, and water vapor, is preferably cooled through a heat exchanger 534, which may operate to recover heat. A cooled gaseous stream 536 leaves the heat exchanger 534 and enters a dehydration unit, which according to disclosed aspects may comprise a quench tower 540. The quench tower 540 operates primarily to remove water generated by the Claus reaction. Much of the excess water vapor is condensed and removed through line 544 as quench water. The quench water is passed through a pump 546 and cooled in a heat exchanger 548. Part of the quench water from line 544, now cooled, is reintroduced into the quench tower 540 near the top of the tower 540. The remaining water from line 544 is removed through a bleed-off line 547. Excess sour water may be removed through line bleed-off line 547 and used elsewhere in the tail gas treating unit 440 for cooling or, ideally, for agricultural purposes if stripped of acid gases. Instead of quench tower 540, other known dehydration methods may be used to remove the water vapor from the gaseous catalytic output stream 532.

A partially dehydrated acid gas stream 542 exits the quench tower and may be recycled back to the front end of a Claus SRU (not shown in FIG. 5). However, as the partially dehydrated acid gas stream disclosed in FIG. 5 contains mostly $CO_2$, some $H_2S$, very little water vapor and no nitrogen, the partially dehydrated acid gas stream may be injected, using injection wells 563 for example, into a reservoir 565 for pressure maintenance, enhanced oil recovery, or carbon capture/sequestration purposes without further processing. Prior to reservoir injection, the partially dehydrated acid gas stream 542 may be pressurized at 560 using a pump, compressor, or the like. Additionally, the partially dehydrated acid gas stream 542 may be subject to additional dehydration 562, using known dehydration processes, prior to injection. In the aspect of the disclosure shown in FIG. 5, both the acid gas enrichment unit and the amine recovery unit of the tail gas treatment unit may be eliminated. Compared with the known process shown in FIG. 3, the disclosed aspects significantly reduce the size, complexity, and cost of an acid gas removal process, and substantially eliminate the need for amine to remove acid gas from the tail gas.

Figure 6:
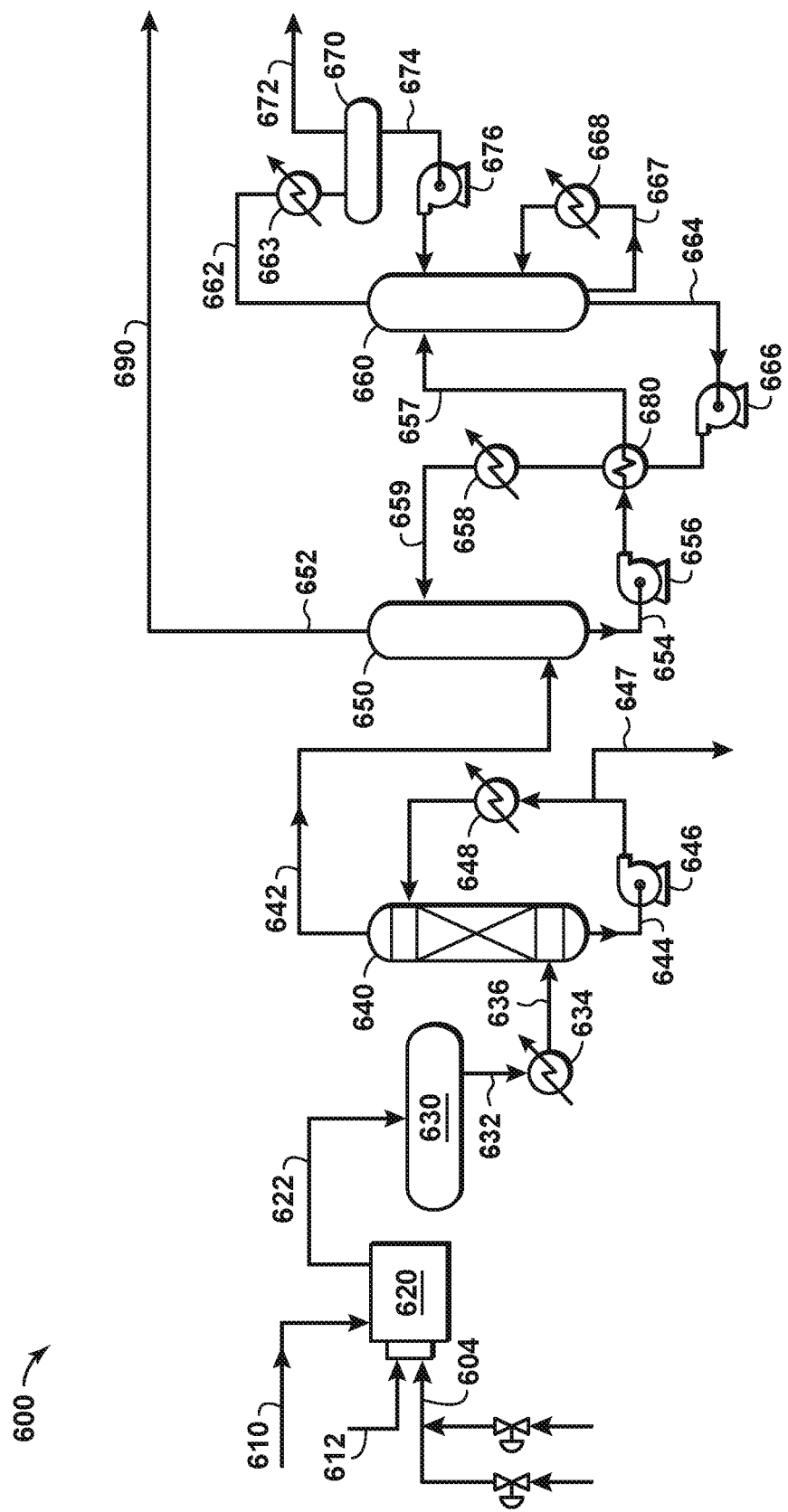
FIG. 6 is a schematic view of a TGTU according to further disclosed aspects.

Aspects of the disclosure may effectively remove $H_2S$ and $CO_2$ from hydrocarbon gases and liquids in a petroleum refinery, biomass, landfill waste gas, etc. By using oxygen enrichment in the range of 21% to 100% volume of oxygen at the MCP, the disclosed aspects remove or limit the nitrogen in the ensuing gas stream, thereby allowing for the concentration of the carbon dioxide therein. This concentrated tail gas stream containing $CO_2$ and $H_2S$ can either be compressed for sequestration or be sent to additional removal or conversion devices including but not limited to fuel cell, amine solvents, and physical solvents to concentrate the $CO_2$ into an acid gas stream to be compressed for sequestration, for power generation or other carbon dioxide products. An example of such removal devices may be found in the tail gas treating unit 500 of FIG. 6, in which an amine absorber 650 and amine regenerator 660 are arranged after RGG 620, catalytic beds 630, and a quench tower 640. RGG 620, catalytic bed 630, and quench tower 640 are functionally similar to RGG 520, catalytic bed 530, and quench tower 540, respectively, and will not be further described. Quench tower 640 releases a cooled tail gas stream 642. Here, the cooled tail gas stream 642 comprises $H_2S$, $CO_2$, trace CO, water vapor, and a variable amount of nitrogen depending on the amount of oxygen enrichment in the mixed stream 604. To remove the $H_2S$, the cooled tail gas stream in line 642 is then contacted with a chemical solvent in absorber 650. The chemical solvent typically is an amine such as an $H_2S$-selective amine Non-selective amines may comprise diethanol amine (DEA), di-isopropanol amine (DIPA), monoethanol amine (MEA), or combinations thereof. The amine is usually methyl diethanol amine (MDEA) or an amine from the Flexsorb® family of amines discussed above. If MDEA is used, the MDEA may be activated to facilitate $CO_2$ absorption. The amine may be activated with piperazine. The amine captures the great majority of the $H_2S$, along with some level of $CO_2$. The amine originates at a solvent tank (not shown) proximate the absorber 650. Movement of the amine into the absorber 650 is aided by a pump, for example, to boost the pressure of the amine to 25 psig or higher.

The tail gas stream is directed from line 642 and upwardly through the absorber 650, while the amine is directed downwardly from line 659 and through the absorber. As the two fluids interact, the downflowing amine absorbs $H_2S$ from the upflowing tail gas stream to produce a "rich" solvent, that is, amine with the absorbed $H_2S$ and some incidental $CO_2$. The rich solvent passes through a bottom line 654, through a booster pump 656, and is heated in a heat exchanger 680 by exchanging heat therein with a regenerated solvent line 664 from a regenerator vessel 660. The rich solvent then moves through line 657 into the regenerator vessel 660, where the amine is regenerated by separating it from the hydrogen sulfide in line 657 for re-use. In an aspect, the regenerator vessel 660 may be a large-diameter vessel that operates at a pressure of about 15 to 25 psig. The regenerator vessel 660 defines a stripper portion typically comprising trays, packings or other internals (not shown) above a reboiler. A heat source 668 is provided to the reboiler to generate vapor traffic within the regenerator vessel 660. The reboiler typically uses steam as its heat source to boil off water and $H_2S$ from the amine. The regenerator vessel 660 allows the rich solvent from line 657 to cascade down through trays or other internals. A portion of the regenerated amine is taken through bottom line 667. From there, the portion of regenerated amine is reheated using a heat exchanger 668, and is then reintroduced to the regenerator vessel 660. However, a majority of the regenerated amine is dropped through a bottom amine line 664. The bottom amine line 664 contains a lean amine stream, which may be at a temperature of about 265° F. The bottom amine line 664 carries lean amine through a booster pump 666. From there, the lean amine passes through the heat exchanger 680 mentioned above, where it warms the rich solvent from line 654. At the same time, thermal contact with the rich solvent from line 654 serves to partially cool the lean amine in bottom amine line 664. The cooled amine may be cooled through a heat exchanger 658. The cooled amine is then carried to the top of the absorber vessel 650 through line 659.

The absorber vessel 650 releases an overhead by-products line 652. The gas in the overhead by-products line 652 includes water vapor and $CO_2$, as well as a variable amount of nitrogen depending on the oxygen concentration of the mixed stream 604 and oxidizer stream 612. These overhead by-products in line 652 are delivered to a release line 690, which takes the overhead by-products to an incinerator. Alternatively, the $CO_2$-rich gas in the overhead by-products line may be dehydrated, pressurized, and injected into a geologic formation or reservoir for pressure maintenance, enhanced oil recovery, and/or carbon capture/sequestration purposes.

Regenerator vessel 660 also has an overhead line 662 which releases the hydrogen sulfide (and incidental $CO_2$) that is separated from the amine in the regenerator vessel 660. The sour gas in line 662 will inevitably contain water vapor and trace amounts of amine Therefore, the $H_2S$-rich sour gas is preferably carried through overhead line 662 to a heat exchanger 663 where it is cooled, and then dropped to a small condensing vessel 670. The heat exchanger 663 may be an air fan cooler or may be a heat exchanger using fresh water or sea water. Cooling the $H_2S$-rich sour gas in line 662 serves to knock out water, which helps to minimize the required water make-up. The condensing vessel 670 produces an $H_2S$-rich acid gas 672, which may be recycled back to the front of the Claus sulfur recovery unit into acid gas line 610 or used for enhanced oil recovery operations in a subsurface reservoir.

Water and amine drop from the condensing vessel 670 through bottom line 674. Together, the water and amine are pressurized in a pump 676 and reintroduced into the top of the regenerator vessel 660. Some of the water is re-vaporized, but most water travels down the regenerator vessel 660 with the lean amine, and is thus recycled.

In some embodiments, the $H_2S$ in the tail gas may be oxidized to $SO_2$ by catalytic, or non-catalytic means. The $SO_2$ in that gas stream may be removed by a diamine solvent, in which case the $SO_2$ would be recycled to the MCP. In other embodiments, the $SO_2$ may be reacted with an adsorbent (either regenerable or non-regenerable) to reduce its concentration to near zero. An amine unit could then be used to recover the $CO_2$ from that nitrogen-containing stream. Of course, as the level of oxygen enrichment increases, the concentration of $CO_2$ in that stream likewise increases. This may shift the preferred $CO_2$ recovery process to physical solvent, for example.

Figure 7:
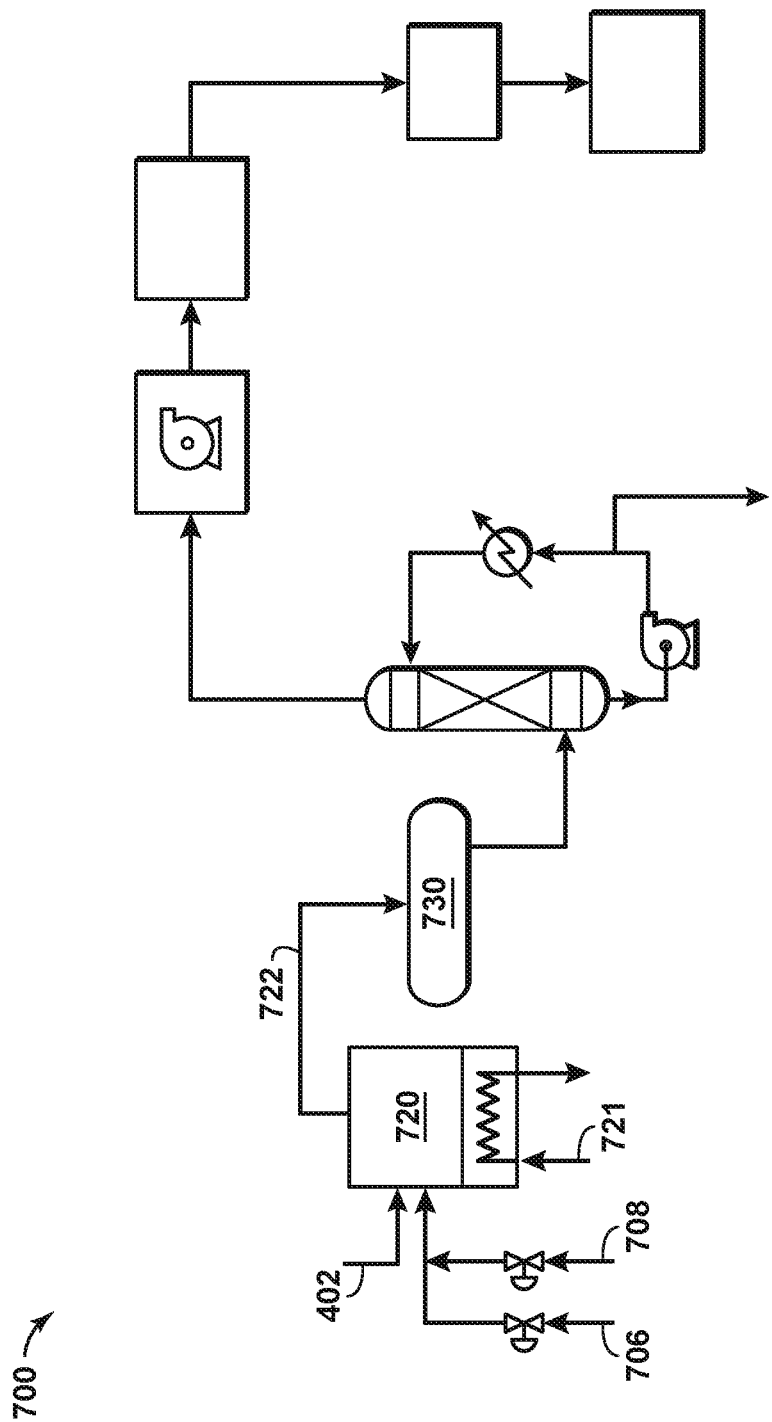
FIG. 7 is a schematic view of a TGTU according to disclosed aspects.

The disclosed aspects may provide further opportunities for refinement of the process to treat tail gas. For example, as shown in FIG. 4 oxygen enrichment up to and including 100% enrichment of the atmospheric air input 425 increases the temperature in the sulfur recovery unit 430 and causes more hydrogen to be formed in the SRU reaction furnace. In such a circumstance, it may not be necessary to combust the tail gas in a reducing gas generator, e.g., 520 in FIG. 5. Instead, as shown in the tail gas treating unit 600 of FIG. 7, a tail gas stream 702 is mixed with a mixed air stream 704, comprising a sub-stoichiometric air flow through line 706 and an oxygen stream 708, as previously described. The fuel gas stream 702 and mixed air stream 704 are directed to a heat exchanger 720 and are heated by indirect heat exchange with steam 721. The resulting preheated tail gas stream 722 is sent to a catalytic bed 730 having a hydrogenation catalyst with a relatively low catalyzation temperature. The embodiment shown in FIG. 7 eliminates the reducing gas generator normally required in a tail gas treating unit, which is advantageous because startup of a reducing gas generator is difficult under sub-stoichiometric conditions.

Figure 8:
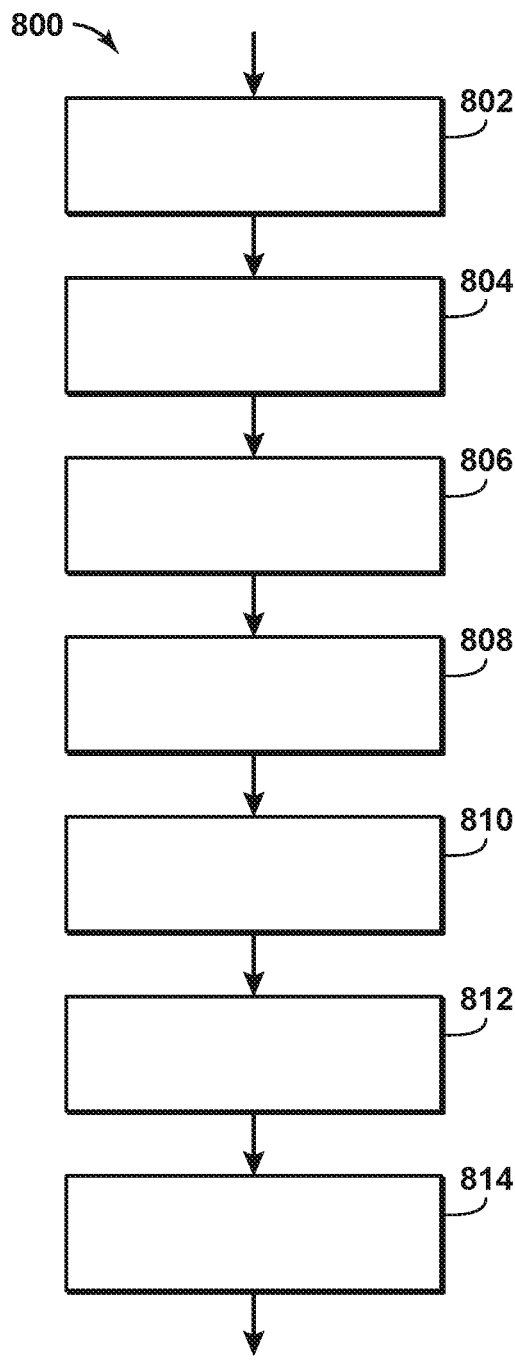
FIG. 8 is a method of processing a gas stream according to the disclosed aspects.

FIG. 8 is a flowchart of a method 800 for processing a hydrocarbon gas stream in a gas processing facility according to an aspect of the disclosure. The hydrocarbon gas stream includes sulfurous components and carbon dioxide. At block 802 the hydrocarbon gas stream is separated into (i) a sweetened gas stream, and (ii) an acid gas stream comprised primarily of hydrogen sulfide and carbon dioxide. At block 804 the acid gas stream and an air stream are received at a sulfur recovery unit (SRU). The air stream is enriched with oxygen such that the air stream comprises between 22% and 100% oxygen. At block 806 the acid gas stream and the air stream are combusted in the SRU to thereby separate the acid gas stream into (i) a liquid stream of elemental sulfur, and (ii) a tail gas stream comprising acid gas impurities. At block 808 the tail gas stream, an air flow, and a fuel gas are sub-stoichiometrically combusted to produce an outlet stream comprising hydrogen sulfide and carbon monoxide. At block 810 the outlet stream is hydrogenated in a catalytic bed, thereby converting sulfur dioxide, carbonyl sulfide, mercaptans, and other sulfur species to a gaseous catalytic output stream comprising hydrogen sulfide. At block 812 water is removed from the gaseous catalytic output stream to produce a partially-dehydrated acid gas stream. At block 814 the partially-dehydrated acid gas stream is compressed and injected into a subsurface reservoir.

Figure 9:
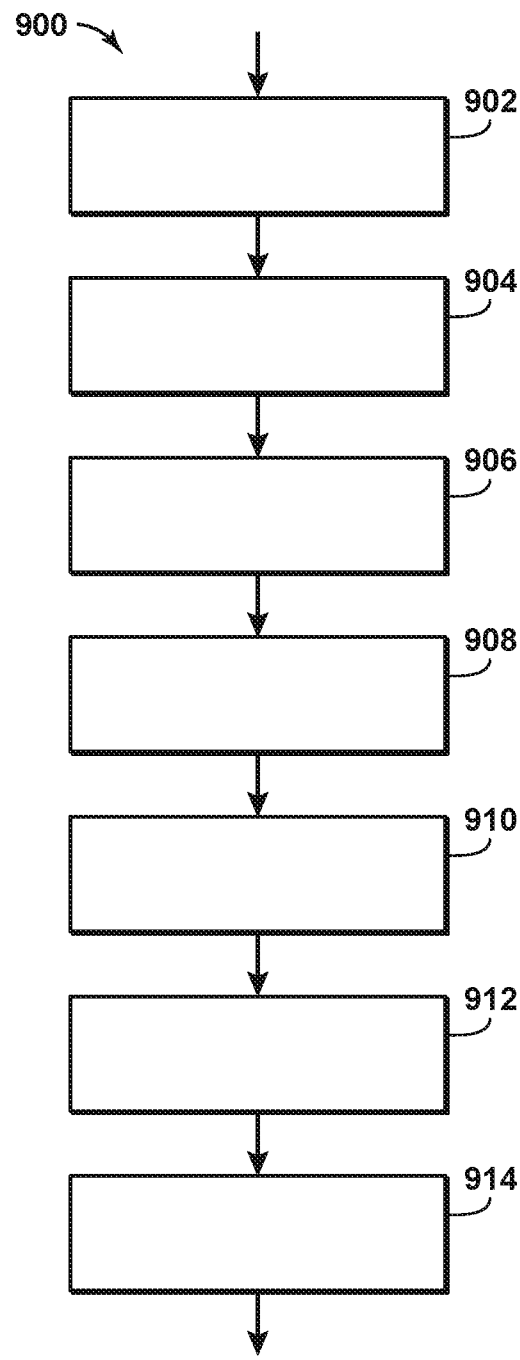
FIG. 9 is a method of processing a gas stream according to the disclosed aspects.

FIG. 9 is a flowchart of a method 900 for processing a hydrocarbon gas stream in a gas processing facility according to another aspect of the disclosure. The hydrocarbon gas stream includes sulfurous components and carbon dioxide. At block 902 the hydrocarbon gas stream is separated into (i) a sweetened gas stream, and (ii) an acid gas stream comprised primarily of hydrogen sulfide and carbon dioxide. At block 904 the acid gas stream and an air stream are received at a sulfur recovery unit (SRU). The air stream is enriched with oxygen such that the air stream comprises between 22% and 100% oxygen. At block 906 the acid gas stream and the air stream are combusted in the SRU to thereby separate the acid gas stream into (i) a liquid stream of elemental sulfur, and (ii) a tail gas stream comprising acid gas impurities. At block 908 the tail gas stream is heated through indirect heat exchange with a source of heat to produce a preheated tail gas stream. At block 910 the preheated tail gas stream is hydrogenated in a catalytic bed, thereby converting sulfur dioxide, carbonyl sulfide, mercaptans, and other sulfur species to a gaseous catalytic output stream comprising $H_2S$. At block 912 water is removed from the gaseous catalytic output stream to produce a partially-dehydrated acid gas stream. At block 914 the partially-dehydrated acid gas stream is pressurized and injected into a subsurface reservoir.

In one arrangement, the gas processing facility further comprises an acid gas enrichment facility for receiving the acid gas stream from the acid gas removal facility, and separating the acid gas stream into (i) an overhead $CO_2$-rich stream, and (ii) an $H_2S$-rich acid gas stream. In this arrangement, the method comprises:
- receiving the $H_2S$-rich acid gas stream as the acid gas stream at the Claus sulfur recovery unit;
- delivering the overhead $CO_2$-rich stream to the compressor station;
- providing pressure to the overhead $CO_2$-rich stream at the compressor station; and
- injecting the overhead $CO_2$-rich stream into the subsurface reservoir along with the sour gas stream from the regenerator vessel.

An advantage of the disclosed aspects is that oxygen enrichment in the SRU reduces the nitrogen content of the tail gas, thus reducing the volume of that stream.

Another advantage is that oxygen enrichment will increase the SRU temperature and cause more hydrogen to be formed in the SRU reaction furnace. This may obviate the need for a reducing gas generator in the tail gas treating unit, because with the advent of "low temperature" hydrogenation catalyst, the tail gas need only be preheated indirectly with steam prior to hydrogenation.

Another advantage is that in some embodiments, oxygen enrichment up to and including 100% as described herein may obviate the need for an acid gas enrichment (AGE) unit altogether, even for very low quality acid gases with <20% $H_2S$. However, during start-up operations it may be necessary to use fuel gas to assist combustion in the furnace.

Still another advantage is that in embodiments with an AGE unit, a single amine regenerator may be common to the AGE and tail gas treatment contactors, which is known to those skilled in the art.

Yet another advantage is that with 100% oxygen enrichment, there is no need for AGE and amine tail gas treatment units at all. In that case, which is shown in FIG. 4 and described herein, the tail gas is preheated indirectly with steam, passes through the CoMo catalyst bed to hydrogenate the $SO_2$ to $H_2S$ and $H_2O$, and passes through the quench tower to produce a dehydrated acid gas stream. Because the partially dehydrated acid gas stream comprises $H_2S$, $CO_2$, and water vapor but no nitrogen, it is ready for injection without further processing. In this embodiment, some nitrogen-containing air may be needed during start-up and/or transient events. If no tail gas treating unit is used, the resulting acid gas stream may be incinerated or vented until steady-state conditions are achieved.

While it will be apparent that the inventions herein described are well calculated to achieve the benefits and advantages set forth above, it will be appreciated that the inventions are susceptible to modification, variation and change without departing from the spirit thereof. For example, the various inventions have been described herein in connection with the processing of a gas stream incident to hydrocarbon recovery operations. However, the gas processing facilities and methods may be applied to the recovery and sequestration of carbon dioxide and hydrogen sulfide in other applications.

For example, the gas processing facilities and methods may be applied to the recovery and sequestration of carbon dioxide and sulfur dioxide from a flue gas stream from a power plant. Alternatively, the gas stream may be a flash gas stream taken from a flash drum in a gas processing facility itself. Alternatively, the gas stream may be a synthesis gas stream (so-called "syn-gas"). It is noted that where syn-gas is used, the gas will need to be cooled and undergo solids filtration before introduction into the facility 400 or 500B. Alternatively still, the gas stream may be a $CO_2$ emission from a cement plant or other industrial plant. In this instance, $CO_2$ may be absorbed from excess air or from a nitrogen-containing flue gas.

While the foregoing is directed to aspects of the present disclosure, other and further aspects of the disclosure may be devised without departing from the basic scope thereof, and the scope thereof is determined by the claims that follow.

What is claimed is:

1. A gas processing facility for processing a hydrocarbon gas stream including sulfurous components and carbon dioxide, the gas processing facility comprising:
   an acid gas removal facility for separating the hydrocarbon gas stream into
      a sweetened gas stream and
      an acid gas stream comprised primarily of hydrogen sulfide and carbon dioxide;
   a Claus sulfur recovery unit (SRU) that receives the acid gas stream and an air stream, the air stream being enriched with oxygen such that the air stream comprises between 22% and 100% oxygen, the SRU combusting the acid gas stream and the atmospheric air to thereby separate the acid gas stream into
      a liquid stream of elemental sulfur, and
      a tail gas stream comprising acid gas impurities; and a tail gas treating unit including
- a reducing gas generator (RGG) that combusts fuel gas and the tail gas stream with an air flow, the RGG sub-stoichiometrically combusting the fuel gas and tail gas stream with the air flow to produce an RGG outlet stream comprising hydrogen sulfide ($H_2S$) and carbon monoxide;
- a catalytic bed configured to receive and hydrogenate the RGG outlet stream, thereby converting sulfur dioxide, carbonyl sulfide, mercaptans, and other sulfur species to a gaseous catalytic output stream comprising $H_2S$;
- a dehydration unit that removes water from the gaseous catalytic output stream to produce a partially-dehydrated acid gas stream; and
- a compressor station for receiving the partially-dehydrated acid gas stream, and providing pressure to the partially-dehydrated acid gas stream for injection into a subsurface reservoir.

2. The gas processing facility of claim 1, wherein the catalytic bed reduces oxidized sulfur species in the RGG outlet stream to $H_2S$.

3. The gas processing facility of claim 1, further comprising an absorber vessel and a regenerator vessel, the dehydration unit using an amine that absorbs both carbon dioxide and sulfurous components such that a majority of the carbon dioxide entering the tail gas treating unit is absorbed in the absorber vessel and released from the absorber vessel to the regenerator vessel in a rich solvent stream.

4. The gas processing facility of claim 3, further comprising:
- a condenser vessel for separating residual amine and condensed water from carbon dioxide and sulfurous components in an overhead gas stream of the regenerator; and
- a line for directing the residual amine and condensed water back to the regenerator vessel;
- and wherein the overhead acid gas stream from the regenerator vessel is taken through the condenser vessel for removal of residual amine and some water vapor before the overhead gas stream is delivered to the compressor station.

5. The gas processing facility of claim 3, further comprising:
- an acid gas enrichment facility for receiving the acid gas stream from the acid gas removal facility, and separating the acid gas stream into (i) an overhead $CO_2$-rich stream, and (ii) an $H_2S$-rich acid gas stream; and
wherein:
- the acid gas stream received by the Claus sulfur recovery unit is the $H_2S$-rich acid gas stream, and
- the overhead $CO_2$-rich stream is directed from the acid gas enrichment facility to the compressor station and placed under pressure for injection into the subsurface reservoir along with the partially-dehydrated acid gas stream.

6. The gas processing facility of claim 1, further comprising:
- a plurality of injection wells for transmitting the pressurized partially-dehydrated acid gas stream from the compressor station to the subsurface reservoir.

7. The gas processing facility of claim 1, wherein the hydrocarbon gas stream comprises raw natural gas from a hydrocarbon production operation.

8. The gas processing facility of claim 1, wherein the dehydration unit comprises a quench tower, and further comprising:
- a cooler that cools at least part of the water removed from the gaseous catalytic output stream and returns at least part of the water to the quench tower.

9. A gas processing facility for processing a hydrocarbon gas stream including sulfurous components and carbon dioxide, the gas processing facility comprising:
- an acid gas removal facility for separating the hydrocarbon gas stream into
  - a sweetened gas stream and
  - an acid gas stream comprised primarily of hydrogen sulfide and carbon dioxide;
- a Claus sulfur recovery unit (SRU) that receives the acid gas stream and an air stream, the air stream being enriched with oxygen such that the air stream comprises between 22% and 100% oxygen, the SRU combusting the acid gas stream and the atmospheric air to thereby separate the acid gas stream into
  - a liquid stream of elemental sulfur, and
  - a tail gas stream comprising acid gas impurities; and
- a tail gas treating unit including
  - a heat exchanger that receives the tail gas stream and an air flow, the tail gas stream and the air flow stream being heated through indirect heat exchange with a source of heat to produce a preheated tail gas stream;
  - a catalytic bed configured to receive and hydrogenate the preheated tail gas stream, thereby converting sulfur dioxide, carbonyl sulfide, mercaptans, and other sulfur species to $H_2S$, thereby forming a gaseous catalytic output stream;
  - a dehydration unit that removes water from the gaseous catalytic output stream to produce a partially-dehydrated acid gas stream; and
  - a compressor station for receiving the partially-dehydrated acid gas stream from the dehydration unit, and providing pressure to the partially-dehydrated acid gas stream for injection into a subsurface reservoir.

10. The gas processing facility of claim 9, further comprising:
- a plurality of injection wells for transmitting the pressurized partially-dehydrated acid gas stream from the compressor station to the subsurface reservoir.

11. The gas processing facility of claim 9, wherein the hydrocarbon gas stream comprises raw natural gas from a hydrocarbon production operation.

12. The gas processing facility of claim 9, wherein the source of heat is steam.

13. A method for processing a hydrocarbon gas stream in a gas processing facility, the hydrocarbon gas stream comprising sulfurous components and carbon dioxide, the method comprising:
- separating the hydrocarbon gas stream into (i) a sweetened gas stream, and (ii) an acid gas stream comprised primarily of hydrogen sulfide and carbon dioxide;
- receiving the acid gas stream at a sulfur recovery unit (SRU);
- receiving an air stream at the SRU, the air stream being enriched with oxygen such that the air stream comprises between 22% and 100% oxygen;
- combusting the acid gas stream and the air stream in the SRU to thereby separate the acid gas stream into (i) a liquid stream of elemental sulfur, and (ii) a tail gas stream comprising acid gas impurities;

with an air flow, sub-stoichiometrically combusting the tail gas stream and fuel gas to produce an outlet stream comprising hydrogen sulfide and carbon monoxide;

hydrogenating the outlet stream in a catalytic bed, thereby converting $SO_2$, COS, mercaptans, and other sulfur species to a gaseous catalytic output stream comprising $H_2S$;

removing water from the gaseous catalytic output stream to produce a partially-dehydrated acid gas stream; and pressurizing the partially-dehydrated acid gas stream to produce a compressed dehydrated acid gas stream; and injecting the compressed, partially-dehydrated acid gas stream into a subsurface reservoir.

14. The method of claim 13, wherein removing the acid gas from the gaseous catalytic output stream is accomplished using an absorber vessel and a regenerator vessel, the method further comprising:

in the absorber vessel, using an amine that absorbs both carbon dioxide and sulfurous components such that a majority of the carbon dioxide entering the tail gas treating unit is absorbed in the absorber vessel and released from the absorber vessel to a regenerator vessel along with sulfurous components in a rich solvent stream.

15. The method of claim 14, wherein the amine comprises methyl diethanol amine (MDEA), and further comprising:

activating the MDEA to facilitate $CO_2$ absorption.

16. The method of claim 14, further comprising:

providing a plurality of acid gas injection wells for transmitting the pressurized partially-dehydrated acid gas stream from the regenerator vessel in the tail gas treating unit to the subsurface reservoir for enhanced oil recovery operations.

17. The method of claim 14, further comprising:

in a condenser vessel, separating residual amine and condensed water from carbon dioxide and sulfurous components in an overhead gas stream of the regenerator vessel; and returning residual amine and condensed water to the regenerator vessel;

wherein the overhead acid gas stream is taken through the condenser vessel for removal of residual amine and some water before the overhead gas stream is delivered to the compressor station.

18. The method of claim 13, wherein:

the gas processing facility further comprises an acid gas enrichment facility for receiving the acid gas stream from the acid gas removal facility, and separating the acid gas stream into (i) an overhead $CO_2$-rich stream, and (ii) an $H_2S$-rich acid gas stream; and the method further comprises:

receiving the $H_2S$-rich acid gas stream as the acid gas stream at the Claus sulfur recovery unit;

delivering the overhead $CO_2$-rich stream to the compressor station;

providing pressure to the overhead $CO_2$-rich stream at the compressor station; and injecting the overhead $CO_2$-rich stream into the subsurface reservoir along with the pressurized partially-dehydrated acid gas stream.

19. The method of claim 14, further comprising:

incinerating an overhead by-products stream from the absorber vessel; and venting the incinerated by-products stream into the atmosphere.

* * * * *